United States Patent
Kitago

(10) Patent No.: US 10,122,988 B2
(45) Date of Patent: Nov. 6, 2018

(54) IMAGE ENCODING APPARATUS, IMAGE DECODING APPARATUS, METHODS OF CONTROLLING THE SAME, AND STORAGE MEDIUM

(71) Applicant: CANON KABUSHIKI KAISHA, Tokyo (JP)

(72) Inventor: Masaki Kitago, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 15/126,326

(22) PCT Filed: Mar. 31, 2015

(86) PCT No.: PCT/JP2015/060689
§ 371 (c)(1),
(2) Date: Sep. 15, 2016

(87) PCT Pub. No.: WO2015/159745
PCT Pub. Date: Oct. 22, 2015

(65) Prior Publication Data
US 2017/0085858 A1 Mar. 23, 2017

(30) Foreign Application Priority Data
Apr. 17, 2014 (JP) ................................. 2014-085885

(51) Int. Cl.
*H04N 13/161* (2018.01)
*H04N 13/111* (2018.01)
(Continued)

(52) U.S. Cl.
CPC ............. *H04N 13/161* (2018.05); *H04N 1/41* (2013.01); *H04N 1/648* (2013.01);
(Continued)

(58) Field of Classification Search
None
See application file for complete search history.

(56) References Cited

U.S. PATENT DOCUMENTS

2002/0172418 A1* 11/2002 Hu ........................... G06T 9/00
382/166
2005/0213812 A1 9/2005 Ishikawa et al. ............. 382/166
(Continued)

FOREIGN PATENT DOCUMENTS

CN 1674665 9/2005
CN 101241235 8/2008
(Continued)

OTHER PUBLICATIONS

Bernd Girod, Chuo-Ling Chang, Prashant Ramanathan, Xiaoqing Zhu, "Light Field Compression Using Disparity-Compensated Lifting", Multimedia and Expo, 2003. ICME '03.Proceedings.2003 International Conference on, Jul. 9, 2003, vol. 1, p. 373-p. 376, Print ISBN: 0-7803-7965-9.
(Continued)

*Primary Examiner* — Eileen M Adams
(74) *Attorney, Agent, or Firm* — Fitzpatrick, Cella, Harper & Scinto

(57) ABSTRACT

This invention enables more efficiently storing and managing light field data. To accomplish this, when encoding N (N>1) viewpoint images captured by a light field imaging unit, an encoding apparatus calculates the average value of the values of N corresponding pixels corresponding to each other in the N viewpoint images and generates an image having the average value as the value of a pixel and focused at a predetermined focal position. The encoding apparatus generates (N−1) types of difference values used to derive the values of the corresponding pixels in the N viewpoint images from the value of the pixel of the generated image focused at the predetermined focal position. The encoding
(Continued)

apparatus encodes the generated image and difference information formed from the (N−1) types of difference values.

16 Claims, 20 Drawing Sheets

(51) Int. Cl.

| | | |
|---|---|---|
| *H04N 13/178* | (2018.01) | |
| *H04N 13/257* | (2018.01) | |
| *H04N 19/597* | (2014.01) | |
| *H04N 19/635* | (2014.01) | |
| *H04N 5/225* | (2006.01) | |
| *H04N 5/232* | (2006.01) | |
| *H04N 9/04* | (2006.01) | |
| *H04N 1/64* | (2006.01) | |
| *H04N 1/41* | (2006.01) | |
| *H04N 13/232* | (2018.01) | |
| *H04N 13/00* | (2018.01) | |

(52) U.S. Cl.
CPC ....... *H04N 5/2254* (2013.01); *H04N 5/23229* (2013.01); *H04N 9/045* (2013.01); *H04N 13/111* (2018.05); *H04N 13/178* (2018.05); *H04N 13/232* (2018.05); *H04N 13/257* (2018.05); *H04N 19/597* (2014.11); *H04N 19/635* (2014.11); *H04N 2013/0081* (2013.01)

(56) References Cited

U.S. PATENT DOCUMENTS

| | | | |
|---|---|---|---|
| 2006/0222079 A1 | 10/2006 | Park et al. | |
| 2008/0193026 A1* | 8/2008 | Horie | H04N 5/23293 |
| | | | 382/238 |
| 2010/0118939 A1* | 5/2010 | Shimizu | H04N 19/00569 |
| | | | 375/240.12 |
| 2012/0327259 A1* | 12/2012 | Tamura | G06T 5/009 |
| | | | 348/222.1 |
| 2013/0322530 A1 | 12/2013 | Rossato et al. | |
| 2014/0146201 A1* | 5/2014 | Knight | H04N 9/04 |
| | | | 348/231.99 |

FOREIGN PATENT DOCUMENTS

| | | |
|---|---|---|
| JP | 2005-286415 | 10/2005 |
| JP | 2008-219878 | 9/2008 |
| JP | 4969474 | 4/2012 |
| JP | 2012-231377 | 11/2012 |
| JP | 2013-050531 | 3/2013 |
| WO | WO 2012/147523 | 11/2012 |

OTHER PUBLICATIONS

Ren Ng, Mathieu Bredif, et. al., "Light Field Photography with a Hand-held Plenoptic Camera", Stanford University Computer Science Tech Report CSTR Feb. 2005, Apr. 2005, p. 1-p. 11.

Chuo-Ling Chang, Xiaoqing Zhu, Prashant Ramanathan, Bernd Girod, "Light Field Compression Using Disparity-Compensated Lifting and Shape Adaptation", Image Processing, IEEE Transactions on, Apr. 2006, vol. 15, Issue:4, p. 793-p. 806, ISSN:1057-7149.

Nov. 20, 2017 European Search Report in European Patent Appln. No. 15780416.2.

Wim Sweldens, "The Lifting Scheme: A Construction of Second Generation Wavelets," Siam Journal on Mathematical Analysis, vol. 29, No. 2, Mar. 1, 1998, pp. 511-546.

Apr. 16, 2018 European Search Report in European Patent Appln. No. 15780416.2.

Zhan Yu, et al., "An Analysis of Color Demosaicing in Plenoptic Cameras," 2012 IEEE Conference on Computer Vision and Pattern Recognition (CVPR), IEEE, Jun. 2012, pp. 901-908.

Neus Sabater, et al., "Light-Field Demultiplexing and Disparity Estimation," Jan. 8, 2014, XP055099221, Retrieved from the internet: URL:http://hal.archives-ouvertes.fr/docs/00/92/56/52/PDF/iccp2014_hal.pdf [retrieved on Jan. 29, 2014].

* cited by examiner

F I G. 6A
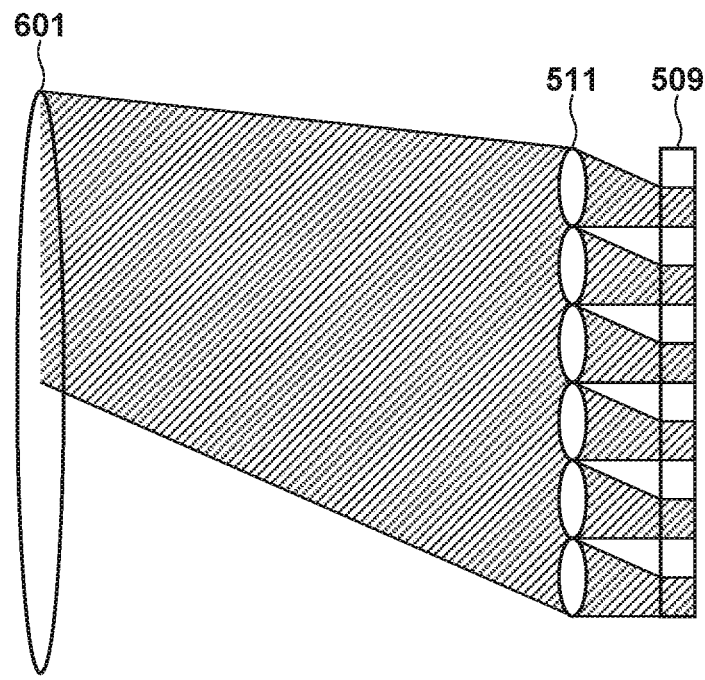
F I G. 6B
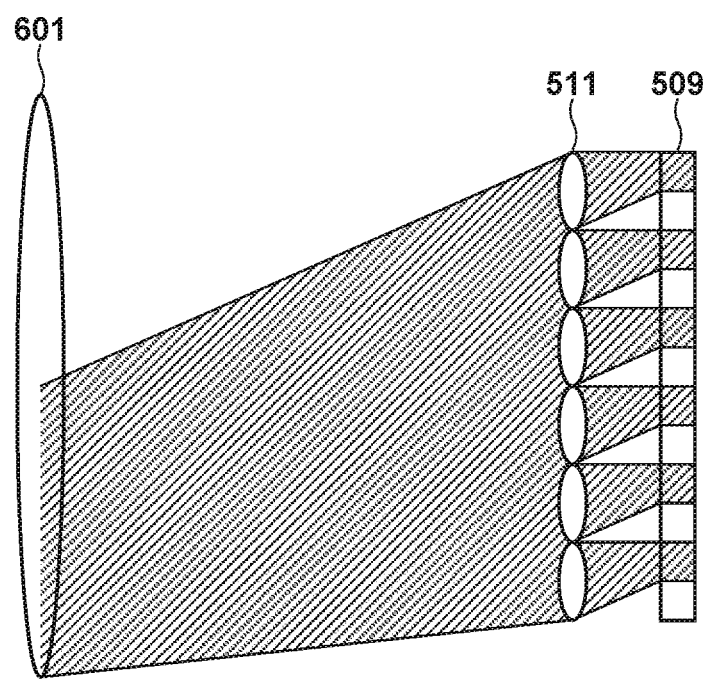

FIG. 7A
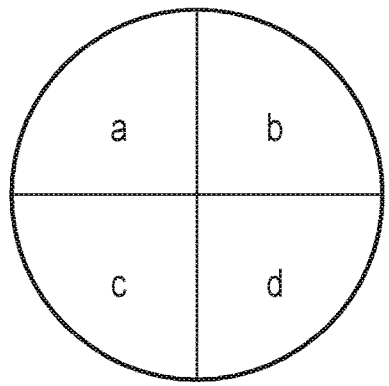
FIG. 7B
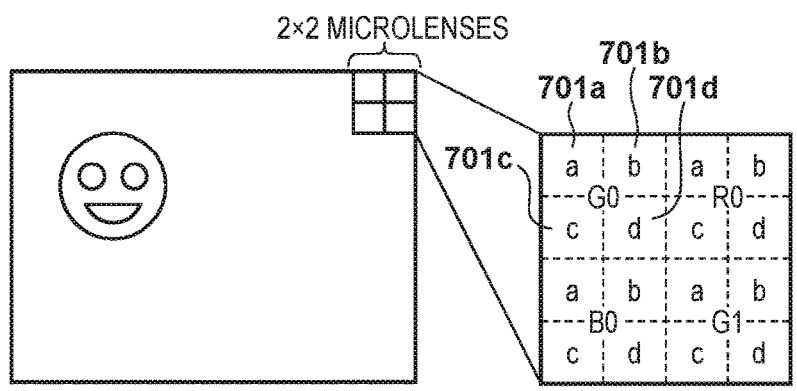
FIG. 7C
| a(G0) | a(R0) | ... |
|---|---|---|
| a(B0) | a(G1) | ... |
| : | : | |
→ GENERATE IMAGE OF VIEWPOINT a BY DEMOSAICING
FIG. 7D
| b(G0) | b(R0) | ... |
|---|---|---|
| b(B0) | b(G1) | ... |
| : | : | |
→ GENERATE IMAGE OF VIEWPOINT b BY DEMOSAICING
FIG. 7E
| c(G0) | c(R0) | ... |
|---|---|---|
| c(B0) | c(G1) | ... |
| : | : | |
→ GENERATE IMAGE OF VIEWPOINT c BY DEMOSAICING
FIG. 7F
| d(G0) | d(R0) | ... |
|---|---|---|
| d(B0) | d(G1) | ... |
| : | : | |
→ GENERATE IMAGE OF VIEWPOINT d BY DEMOSAICING

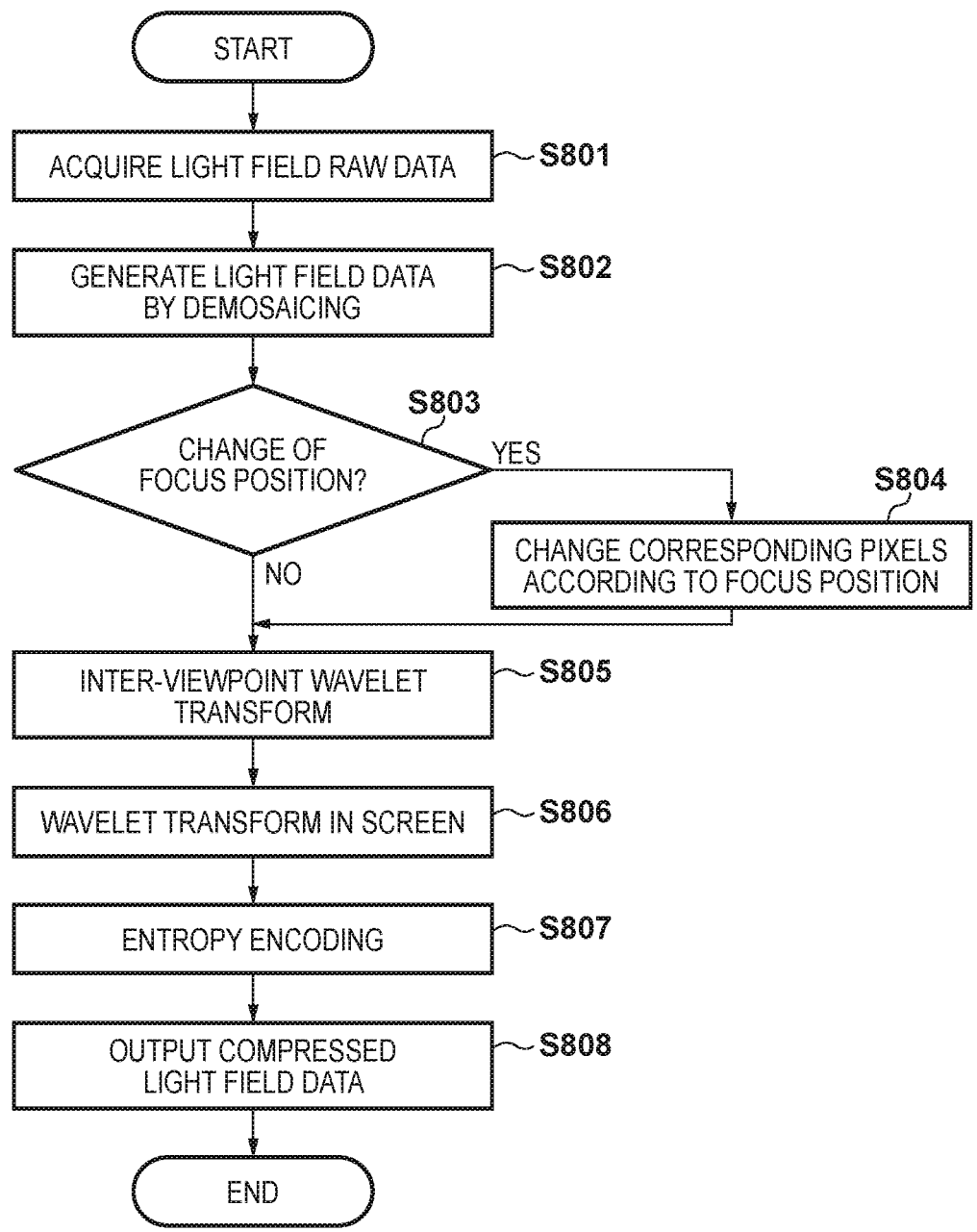

FIG. 10A

| a | b | a | b |
|---|---|---|---|
| c | d | c | d |
| a | b | a | b |
| c | d | c | d |

FIG. 10B

| R | d1 | R | d1 |
|---|---|---|---|
| d2 | d3 | d2 | d3 |
| R | d1 | R | d1 |
| d2 | d3 | d2 | d3 |

FIG. 10C

| R | R |
|---|---|
| R | R |

| d1 | d1 |
|---|---|
| d1 | d1 |

| d2 | d2 |
|---|---|
| d2 | d2 |

| d3 | d3 |
|---|---|
| d3 | d3 |

FIG. 10D

| LL (R) | HL (R) |
|---|---|
| LH (R) | HH (R) |

| LL (d1) | HL (d1) |
|---|---|
| LH (d1) | HH (d1) |

| LL (d2) | HL (d2) |
|---|---|
| LH (d2) | HH (d2) |

| LL (d3) | HL (d3) |
|---|---|
| LH (d3) | HH (d3) |

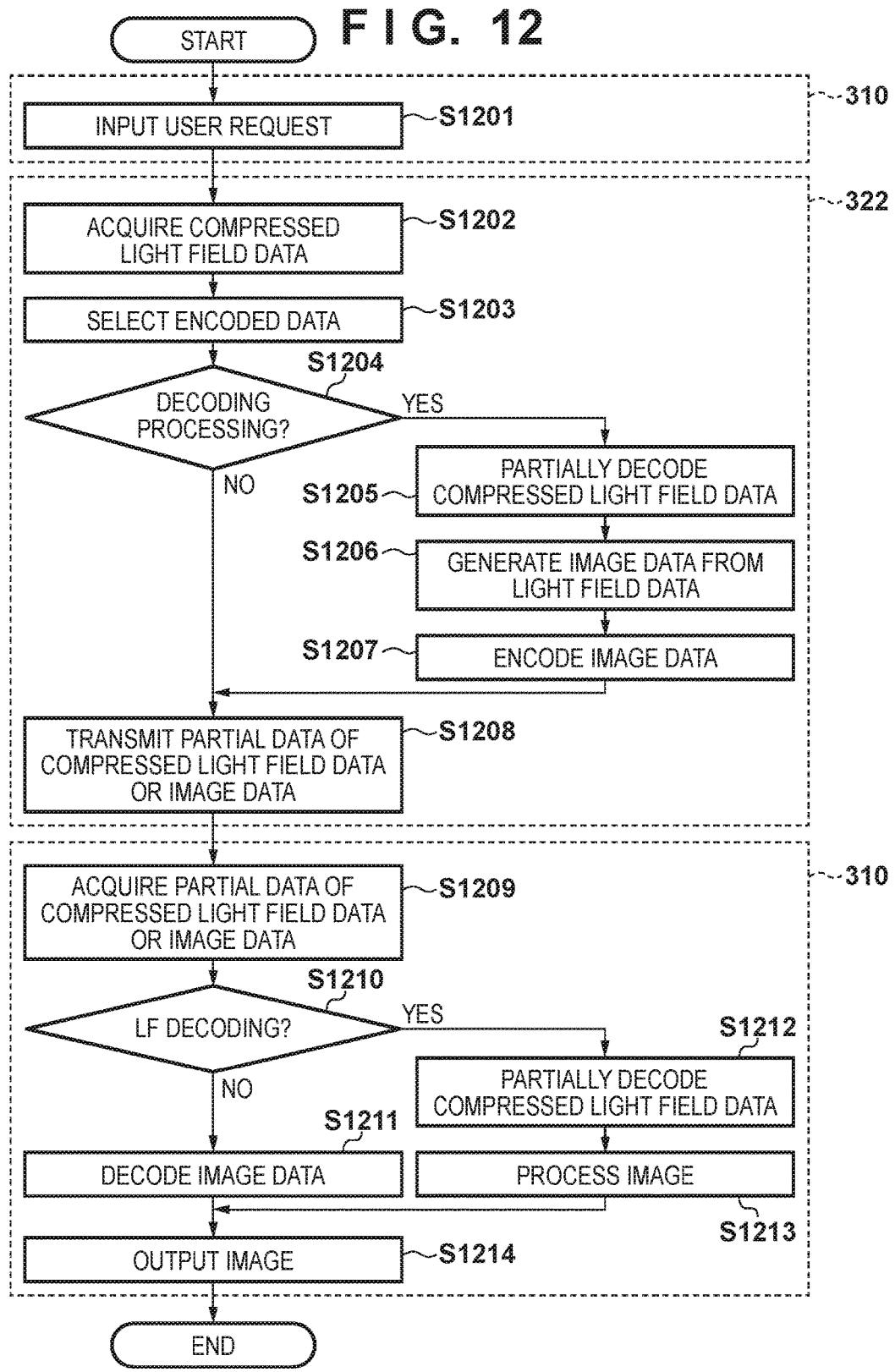

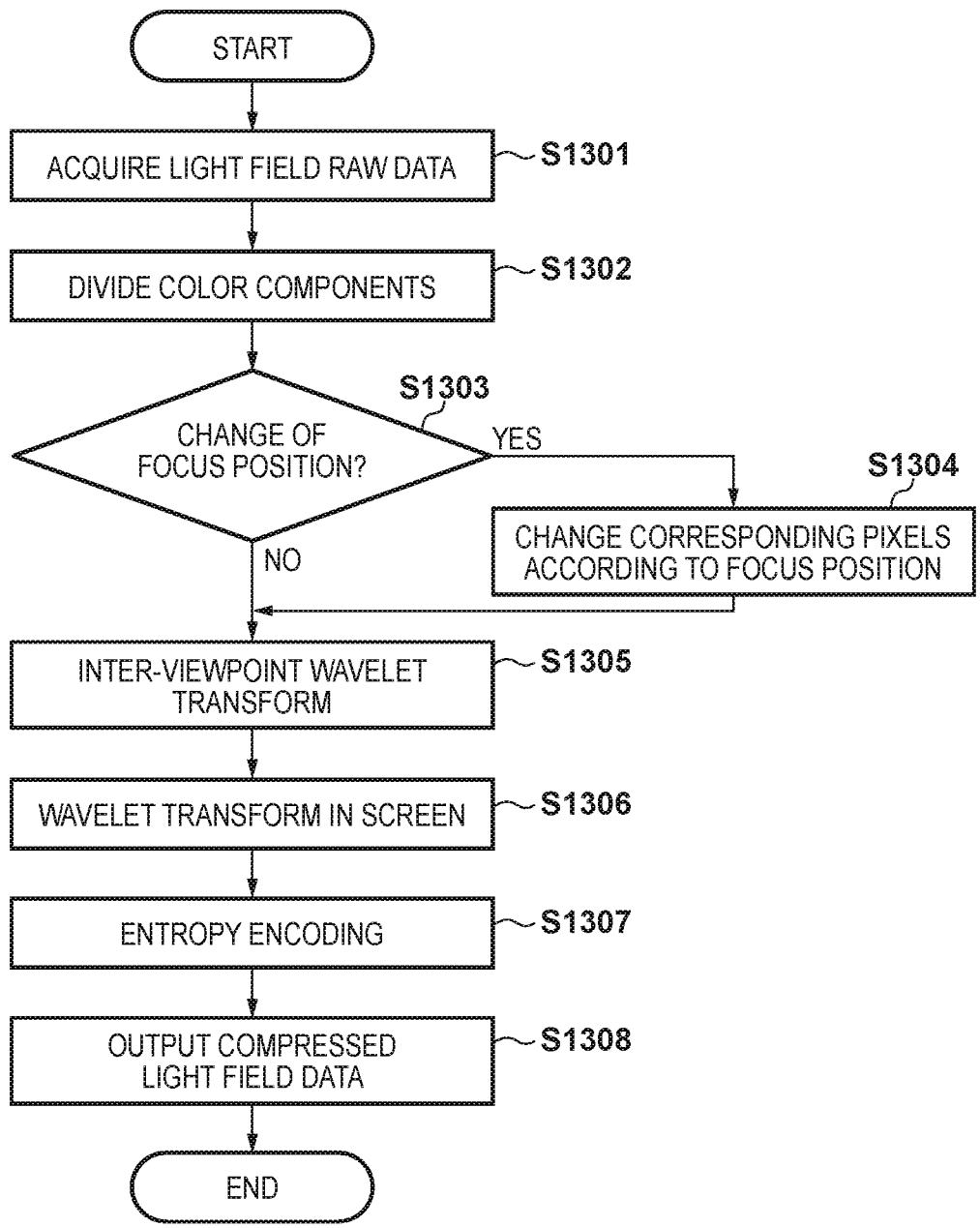

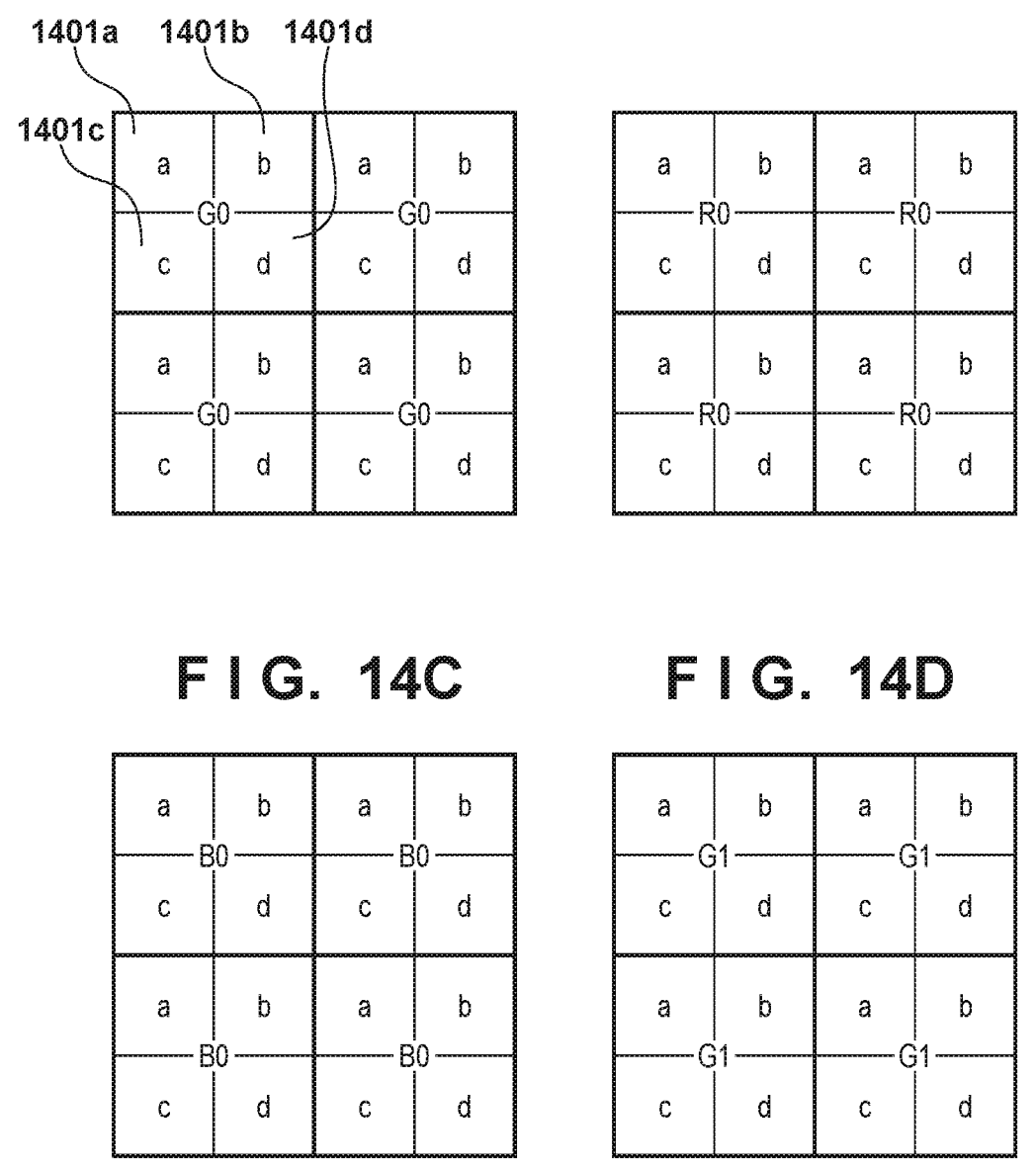

| a | b | a | b |
|---|---|---|---|
| — G0 — | — G0 — |
| c | d | c | d |
| a | b | a | b |
| — G0 — | — G0 — |
| c | d | c | d |

FIG. 14B

| a | b | a | b |
|---|---|---|---|
| — R0 — | — R0 — |
| c | d | c | d |
| a | b | a | b |
| — R0 — | — R0 — |
| c | d | c | d |

FIG. 14C

| a | b | a | b |
|---|---|---|---|
| — B0 — | — B0 — |
| c | d | c | d |
| a | b | a | b |
| — B0 — | — B0 — |
| c | d | c | d |

FIG. 14D

| a | b | a | b |
|---|---|---|---|
| — G1 — | — G1 — |
| c | d | c | d |
| a | b | a | b |
| — G1 — | — G1 — |
| c | d | c | d |

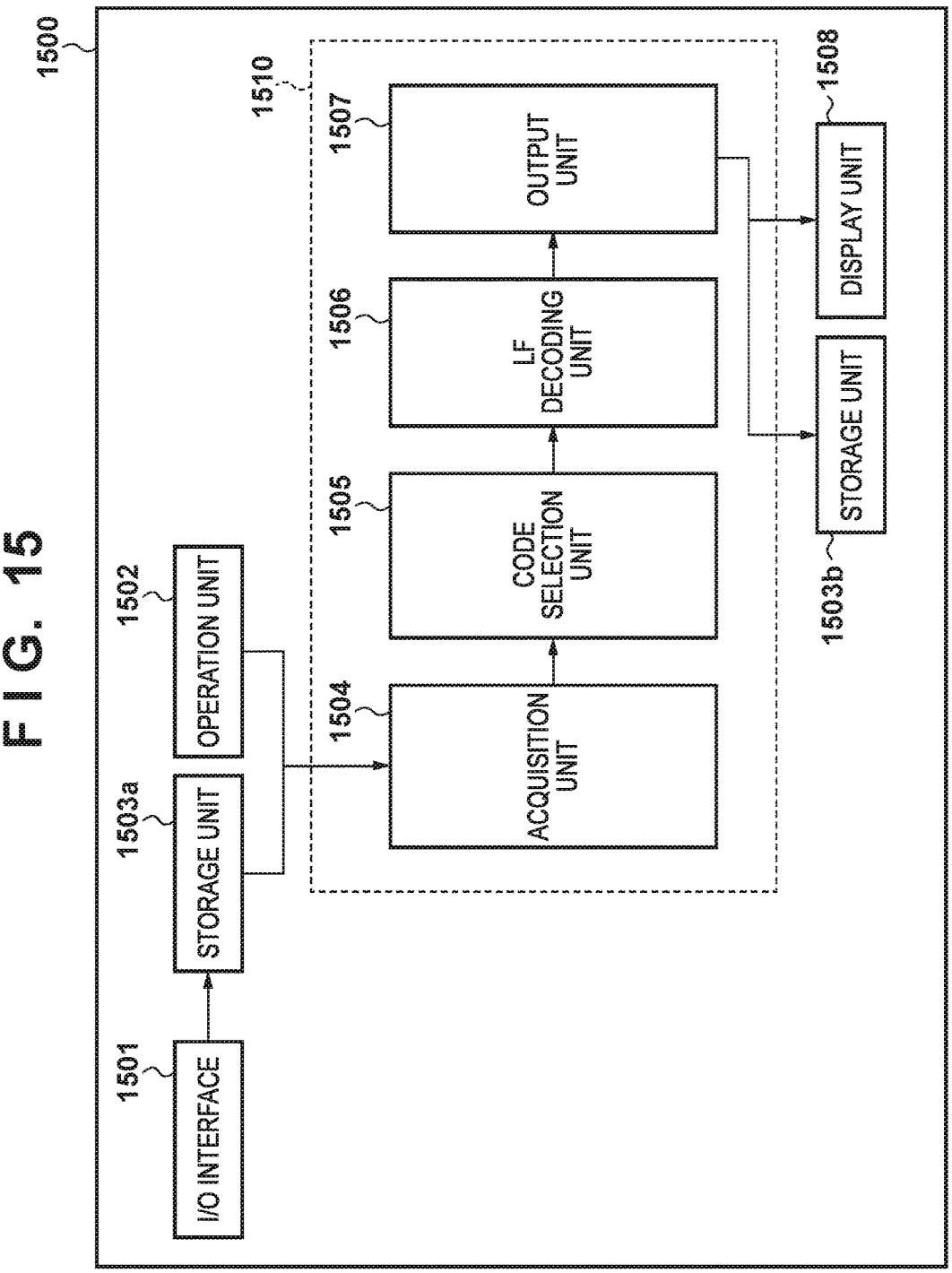

FIG. 17A
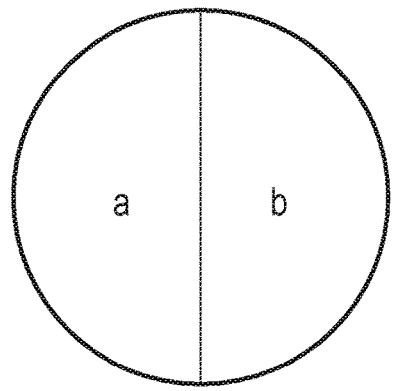
FIG. 17B
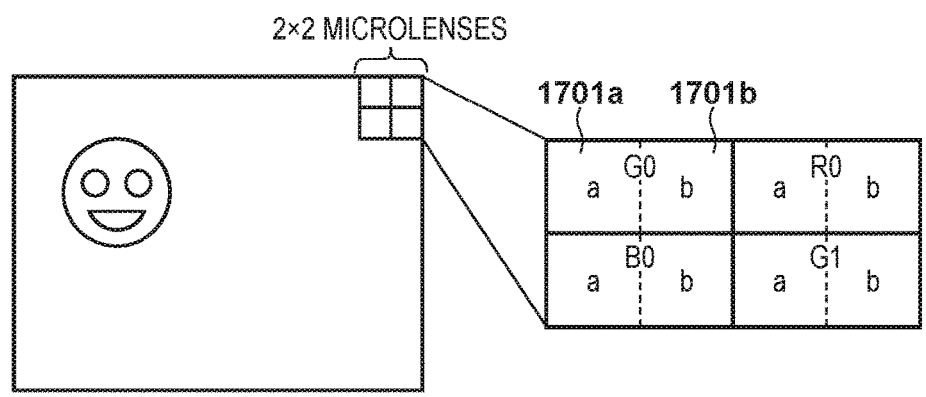
FIG. 17C
| a(G0) | a(R0) | ... |
|---|---|---|
| a(B0) | a(G1) | ... |
| : | : | |
→ GENERATE IMAGE OF VIEWPOINT a BY DEMOSAICING
FIG. 17D
| b(G0) | b(R0) | ... |
|---|---|---|
| b(B0) | b(G1) | ... |
| : | : | |
→ GENERATE IMAGE OF VIEWPOINT b BY DEMOSAICING FIG. 18A
| a | b | a | b |
|---|---|---|---|
| a | b | a | b |
FIG. 18B
| R | d | R | d |
|---|---|---|---|
| R | d | R | d |
FIG. 18C
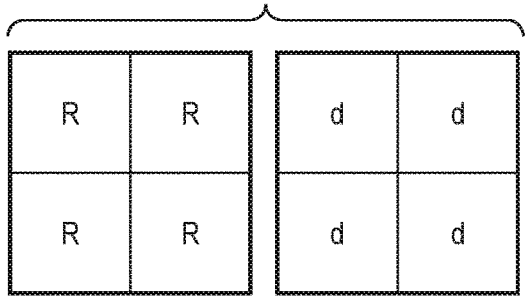
FIG. 18D
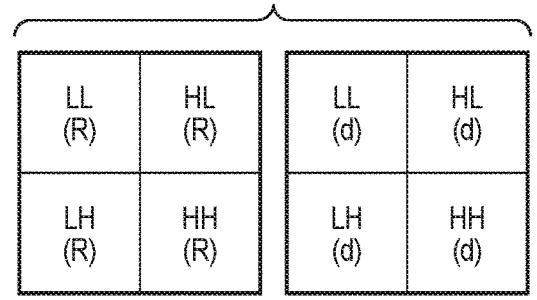

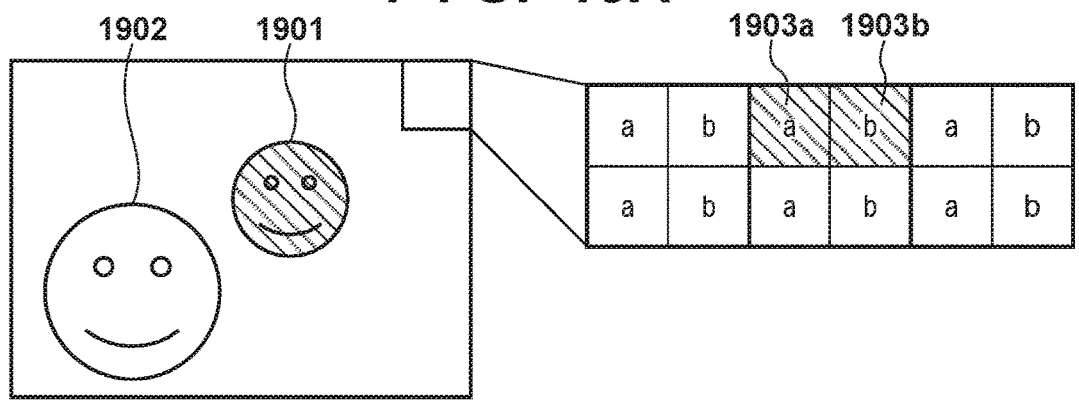
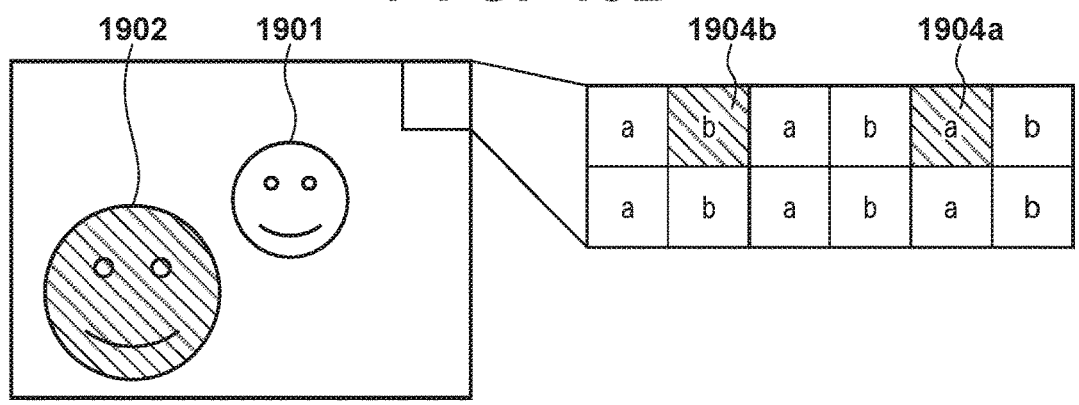

IMAGE ENCODING APPARATUS, IMAGE DECODING APPARATUS, METHODS OF CONTROLLING THE SAME, AND STORAGE MEDIUM

CROSS REFERENCE TO RELATED APPLICATION

The present application is a national-stage entry under 35 U.S.C. § 371 of International Application No. PCT/JP2015/060689, filed Mar. 31, 2015, and claims the benefit of foreign priority under 35 U.S.C. § 119 of Japanese Application No. 2014-085885, filed on Apr. 17, 2014.

TECHNICAL FIELD

The present invention relates to a technique of encoding image data captured by a light field imaging apparatus represented by a plenoptic camera.

BACKGROUND ART

A plenoptic camera acquires light field data (multi-viewpoint image group) representing the positions and angle information of light beams. When the light field data is used, it is possible to adjust the focus position after imaging, change the viewpoint position, and acquire the distance to an object. This technique is known as computational photography. As a method of encoding or decoding light field data (multi-viewpoint image group) captured by a plenoptic camera, a method of JPEG-encoding a specific viewpoint and LZ-encoding the remaining viewpoints is known. A literature that discloses the technique is Japanese Patent No. 4969474.

The light field data captured by the plenoptic camera is preferably held in a small data amount. In addition, it is preferable to efficiently hold the data to cope with various processing requests from the user for refocus processing (adjusting the focus position after imaging), depth estimation processing, stereo vision, naked eye stereo vision, and the like. In a conventional method, a refocus image or a depth map is generated in advance from light field data, and the generated data is output in accordance with a processing request from the user. However, since the data are generated in advance, the amount of held data increases. In another method, light field data is encoded, and data is generated by decoding the light field data in accordance with a processing request from the user. However, since data generation is performed by decoding the light field data for each processing request from the user, the processing load increases. That is, there is demanded a light field data encoding method capable of quickly coping with various processing requests from a user.

SUMMARY OF INVENTION

The present invention provides an encoding technique of more efficiently storing and managing light field data than ever before. The present invention also provides a technique of generating encoded data capable of quickly coping with various processing requests from the user.

According to a first aspect of the present invention, there is provided an image encoding apparatus that encodes N (N is an integer: N≥2) viewpoint images captured at viewpoints different from each other, comprising: first generation means for calculating an average value of values of N corresponding pixels corresponding to each other in the N viewpoint images and generating an image having the average value as a value of a pixel; second generation means for generating (N−1) types of difference values used to derive the values of the corresponding pixels in the N viewpoint images from the value of the pixel generated by the first generation means; and encoding means for encoding the image generated by the first generation means and difference information formed from the (N−1) types of difference values generated by the second generation means.

According to a second aspect of the present invention, there is provided a method of controlling an image encoding apparatus that encodes N (N is an integer: N≥2) viewpoint images captured at viewpoints different from each other, comprising: a first generation step of calculating an average value of values of N corresponding pixels corresponding to each other in the N viewpoint images and generating an image having the average value as a value of a pixel; a second generation step of generating (N−1) types of difference values used to derive the values of the corresponding pixels in the N viewpoint images from the value of the pixel generated in the first generation step; and an encoding step of encoding the image generated in the first generation step and difference information formed from the (N−1) types of difference values generated in the second generation step.

According to a third aspect of the present invention, there is provided a computer-readable storage medium storing a program for causing a computer to execute each steps of the method.

According to a fourth aspect of the present invention, there is an image decoding apparatus that decodes encoded data of N (N is an integer: N≥2) viewpoint images captured at viewpoints different from each other, comprising: storage means for storing first encoded data obtained by encoding an image focused at a predetermined focal position and having, as a value of a pixel, an average value of values of N corresponding pixels corresponding to each other in the N viewpoint images and second encoded data obtained by encoding difference information formed from (N−1) types of difference values used to derive the values of the corresponding pixels in the N viewpoint images from the image having the average value of the values of the N corresponding pixels as the value of the pixel; and decoding means for decoding at least one of the encoded data stored in the storage means.

According to a fifth aspect of the present invention, there is a method of controlling an image decoding apparatus that decodes encoded data of N (N is an integer: N≥2) viewpoint images captured at viewpoints different from each other, comprising: a storage step of storing, in predetermined storage means, first encoded data obtained by encoding an image focused at a predetermined focal position and having, as a value of a pixel, an average value of values of N corresponding pixels corresponding to each other in the N viewpoint images and second encoded data obtained by encoding difference information formed from (N−1) types of difference values used to derive the values of the corresponding pixels in the N viewpoint images from the image having the average value of the values of the N corresponding pixels as the value of the pixel; and a decoding step of decoding at least one of the encoded data stored in the storage step.

According to the present invention, light field data can be stored and managed more efficiently.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 6A and 6B are views showing a method of separating light beams by a plenoptic camera;

FIGS. 7A to 7F are views showing an example of light field data according to the first embodiment;

FIG. 8 is a flowchart showing an example of encoding processing performed in the first embodiment;

FIGS. 10A to 10D are views showing a method of wavelet-transforming light field data;

FIG. 12 is a flowchart showing an example of decoding processing performed in the first embodiment;

FIG. 13 is a flowchart showing an example of encoding processing performed in the second embodiment;

FIGS. 14A to 14D are views showing an example of light field RAW data according to the second embodiment;

FIG. 15 is a block diagram showing an example of the arrangement of an image decoding apparatus according to the second embodiment;

FIGS. 17A to 17D are views showing an example of light field data according to the third embodiment;

FIGS. 18A to 18D are views showing a method of wavelet-transforming light field data;

FIGS. 19A and 19B are views showing a method of generating a refocus image from light field data;

FIGS. 20A to 20D are views showing an example of light field RAW data according to the fourth embodiment.

DESCRIPTION OF EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

The first embodiment is applied to an image encoding apparatus that encodes light field data acquired by a plenoptic camera and an image decoding apparatus that decodes partial data of compressed light field data in accordance with a user request and outputs image data. The image encoding apparatus according to the first embodiment will be described below.

Although details will be apparent from the following description, in the first embodiment, to efficiently encode light field data (image of each viewpoint which will be referred to as a viewpoint image hereinafter) obtained from a light field data imaging unit, the average value of the values of pixels (to be referred to as corresponding pixels hereinafter) corresponding to each other in N (N is an integer: N≥2) viewpoint images is obtained, and one image that is formed from the pixels of the average value and focused at a predetermined focus position is generated. Then, (N−1) types of difference values used to derive the pixel values of each original viewpoint image are calculated from the pixel values of the focus image. Since there are a total of N types of data including the average value and the (N−1) difference values, the pixel values of the N original viewpoint images can be reconstructed. The focus image and difference information formed from the difference values are encoded. As a result, if the image desired by the user is the composite image in focus at the time of encoding the difference information need not be decoded, and only the encoded data of the focus image is decoded. The present inventor focused on Haar wavelet transform that is a transform convenient for generating the pixels of the focus image and generating difference information used to reconstruct the original viewpoint images. Although the Haar wavelet transform normally transforms an image itself, this technique is applied to transform the corresponding pixels of the viewpoint images. Note that any transform other than the Haar wavelet transform is usable if it can generate the difference information and the pixel values of the average value of the viewpoint images to reconstruct the viewpoint images. As another characteristic feature of this embodiment, to cope with a user's demand to, for example, generate a stereo image from viewpoint images, encoded data to implement this by minimum and necessary decoding processing is generated. In the first embodiment, the number of viewpoints of light field data is 2×2=4. However, the present invention is not limited to this number, as a matter of course. The first embodiment will be described.

Figure 1:
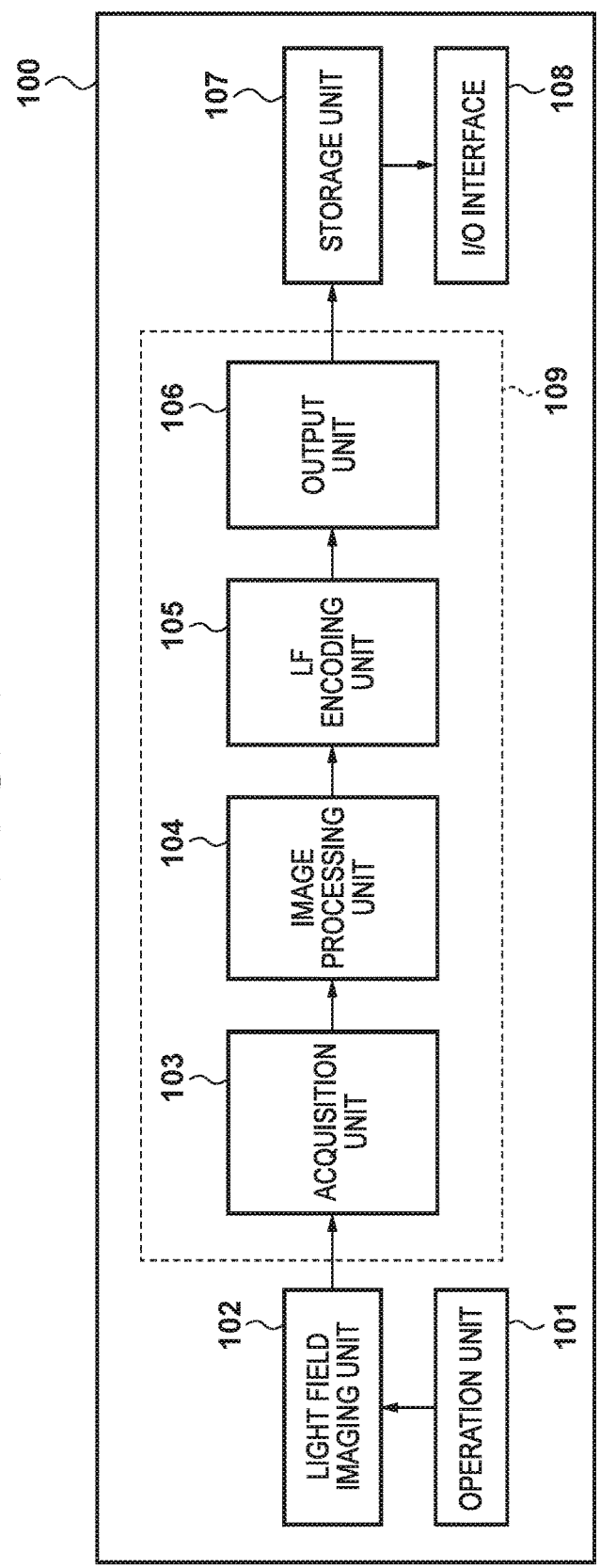
FIG. 1 is a block diagram showing an example of the arrangement of an image encoding apparatus.

FIG. 1 is a block diagram showing an example of the arrangement of an image encoding apparatus according to the first embodiment, which is applied to a camera. A camera 100 includes an operation unit 101, a light field imaging unit 102, an information processing unit 109, a storage unit 107, and an I/O interface 108.

The camera 100 is a plenoptic camera. An image acquired by the plenoptic camera includes multi-viewpoint information in one image. In this embodiment, RAW data acquired by the plenoptic camera will be referred to as light field RAW data, and data obtained by demosaicing light field RAW data will be referred to as light field data.

Figure 5A:
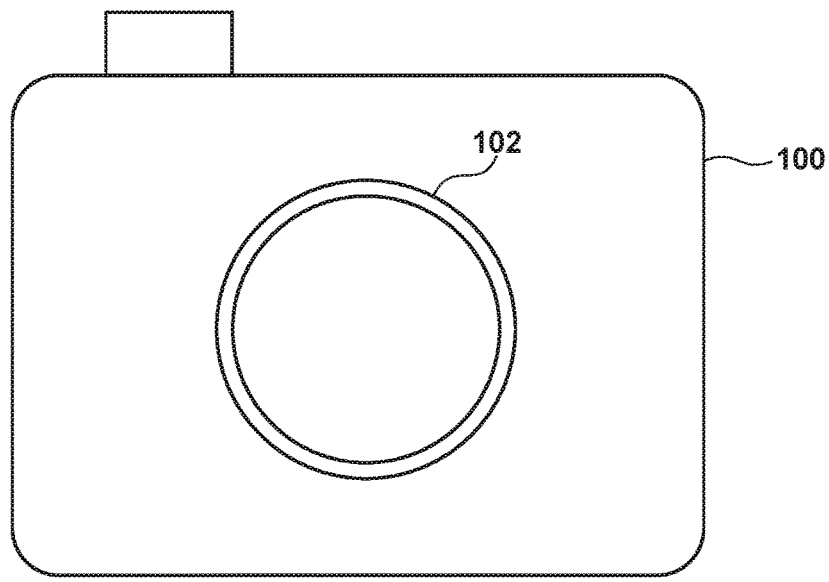
FIGS. 5A and 5B are views showing an example of the arrangement of the imaging unit of a camera.
Figure 5B:
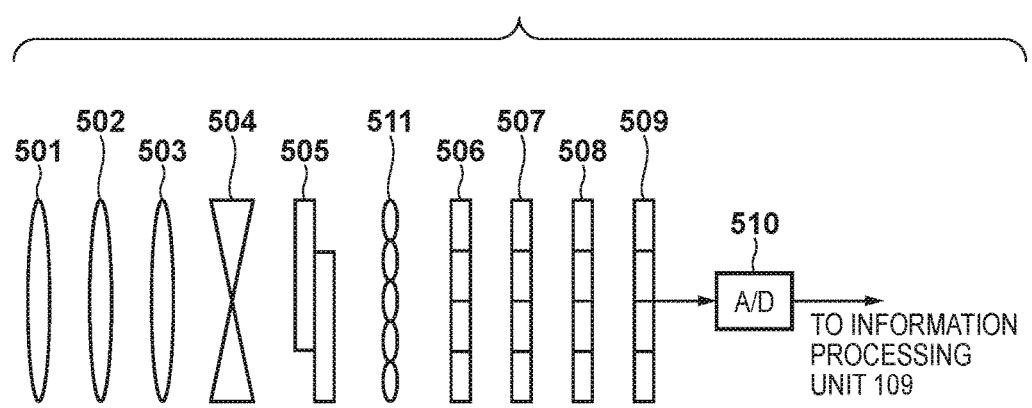

FIG. 5A is a view showing the outer appearance of the camera 100. As shown in FIG. 5A, the camera 100 includes the light field imaging unit 102. FIG. 5B is a view showing the internal structure of the light field imaging unit 102. The light field imaging unit 102 includes a zoom lens 501, focus lenses 502 and 503, an aperture stop (to be simply referred to as a stop hereinafter) 504, and a shutter 505. The light field imaging unit 102 also includes an optical low-pass filter 506, an iR cut filter 507, a color filter 508, an image sensor 509, and an A/D conversion unit 510. The user can adjust the amount of light incident on the light field imaging unit 102 by adjusting the stop 504. The image sensor 509 is a light-receiving element such as a CMOS or CCD. When the image sensor 509 detects the light amount of an object, the detected light amount is converted into a digital value by the A/D conversion unit 510 and output to the information processing unit 109 as digital data.

The light field imaging unit 102 also includes a microlens array 511 in which a plurality of small convex lenses are arranged in an array. When the imaging lens 501 and the focus lenses 502 and 503 are virtually regarded as one lens, the microlens array 511 is arranged on the image plane of the virtual lens. When the microlens array 511 is arranged on the image plane of the virtual lens, the incident directions of light beams that enter the image sensor 509 can be separated. Note that one microlens included in the microlens array 511 corresponds to m×n light-receiving elements in the image sensor 509.

FIGS. 6A and 6B are views showing a state in which the microlens array 511 separates light beams entering from a virtual lens 601 (formed from the imaging lens 501 and the focus lenses 502 and 503). Light beams entering from the upper half of the virtual lens 601 and those entering from the lower half of the virtual lens 601 irradiate different pixel regions of the image sensor 509. Information of each pixel region is selectively extracted, thereby extracting multi-viewpoint information from light field data.

Figure 4:
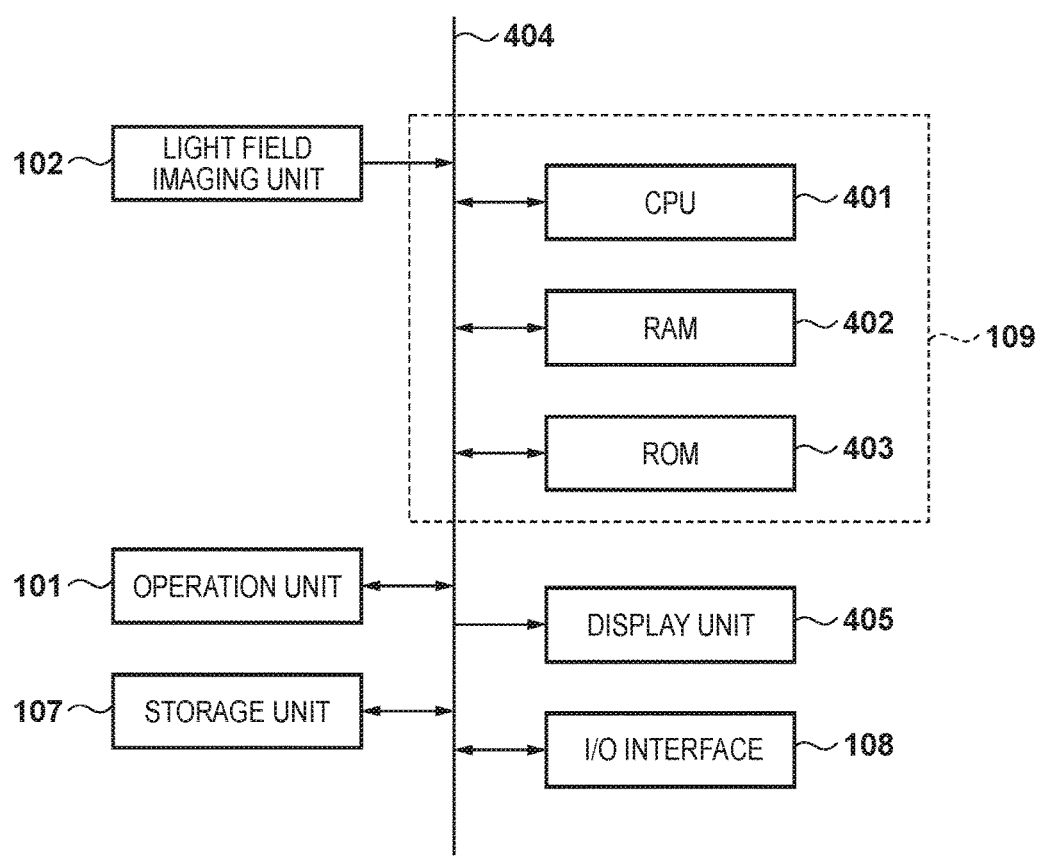
FIG. 4 is a block diagram showing the hardware arrangement of an information processing unit.

FIG. 4 is a block diagram showing the internal arrangement of the camera 100, particularly, the information processing unit 109. The information processing unit 109 includes a CPU 401, a RAM 402, and a ROM 403. The constituent elements of the camera are connected to each other via a system bus 404.

The CPU 401 is a processor that generally controls the units in the camera 100. The RAM 402 functions as the main memory and work area of the CPU 401. The ROM 403 stores a program shown in the flowchart of FIG. 8 (to be described later). The information processing unit 109 causes the CPU 401 to read out and execute the program stored in the ROM 403 as program codes, thereby implementing the role of each of the components 103 to 106 shown in FIG. 1. Note that except the above-described components, the arrangement of the information processing unit 109 may include a dedicated processing circuit and the like which implement the roles of the components shown in FIG. 1.

The operation unit 101 is an input device such as a button, a dial, a touch panel, or the like provided on the camera body. The user can input an instruction to start/stop shooting and setting shooting conditions by operating the operation unit 101. In this embodiment, the user can set a refocus mode to adjust the focus position after imaging.

The storage unit 107 is a nonvolatile storage medium such as a memory card capable of storing light field RAW data acquired by the light field imaging unit 102 and light field data.

The I/O interface 108 can use a serial bus connection implemented by USB (Universal Serial Bus) and includes a corresponding USB connector. A LAN connection using an optical fiber or wireless connection may be used, as a matter of course.

A display unit 405 displays a shot image or characters. In general, a liquid crystal display is used as the display unit 405. The display unit 405 may have a touch panel function. In this case, a user instruction using the touch panel can be handled as an input to the operation unit 101.

Light field data acquired by the plenoptic camera will be described with reference to FIGS. 7A to 7F. The plenoptic camera can extract light beam information passing through each of divided regions formed by dividing the main lens as shown in FIG. 7A. The main lens is the virtual lens 601 when the imaging lenses 501 to 503 are virtually regarded as one lens. In this embodiment, a case where the main lens is divided into 2×2 (to be referred to as 2×2 division hereinafter) multi-viewpoints in the horizontal and vertical directions, and light beam information of each viewpoint is extracted will be described.

As shown in FIG. 7B, a light beam that has passed through a region a of the main lens enters a pixel group 701a on the sensor, and a light beam that has passed through a region b of the main lens enters a pixel group 701b on the sensor. That is, the output from the pixel group 701a includes the information of a viewpoint corresponding to the lens region a, and the output from the pixel group 701b includes the information of a viewpoint corresponding to the lens region b. In this embodiment, the sensor has the RGB arrangement of the Bayer pattern based on 2×2 sensors as a unit, as shown in FIG. 7B. That is, each of the R, G, and B colors is divided into 2×2=4 sensors. In this embodiment, a signal detected by each sensor is A/D-converted into a 14-bit signal. That is, one color component of each pixel is expressed by 14 bits. The present invention is not limited to this division form, as a matter of course, and one color component may be expressed by another number of bits such as 10 bits or 12 bits by dynamic range compression per color component. RAW data thus acquired by the plenoptic camera will be referred to as light field RAW data.

Data obtained by demosaicing and developing the light field RAW data shown in FIG. 7B will be referred to as light field data.

For example, when data of elements "a" of G0, R0, B0, and G1 passed through the color filter 508 in FIG. 7B are expressed as a(G0), a(R0), a(B0), and a(G1), respectively, the set can be expressed as in FIG. 7C. The arrangement shown in FIG. 7C is the same as the Bayer arrangement of a normal image sensor having a relationship of 1 color filter=one element. Hence, an image "a" including three, R, G, and B components (in this embodiment, each component is expressed by 8 bits) per pixel can be generated by demosaicing.

Similarly, when data of elements "b" of G0, R0, B0, and G1 passed through the color filter 508 are expressed as b(G0), b(R0), b(B0), and b(G1), respectively, the set can be expressed as in FIG. 7D, and an image "b" can be generated by demosaicing. When data of elements "c" of G0, R0, B0, and G1 passed through the color filter 508 are expressed as c(G0), c(R0), c(B0), and c(G1), respectively, the set can be expressed as in FIG. 7E, and an image "c" can be generated by demosaicing. When data of elements "d" of G0, R0, B0, and G1 passed through the color filter 508 are expressed as d(G0), d(R0), d(B0), and d(G1), respectively, the set can be expressed as in FIG. 7F, and an image "d" can be generated by demosaicing.

By demosaicing the light field RAW data in the above-described way, light field data formed from four images a, b, c, and d (images of viewpoints a, b, c, and d in other words) each including three components per pixel is generated. Note that the light field data generated here does not have the Bayer arrangement any longer, and the pixels of the images a, b, c, and d and the elements a, b, c, and d shown on the right side of FIG. 7B have no direct relationship.

In consideration of the above fact, details of encoding processing of the information processing unit 109 according to this embodiment will be described below. FIG. 8 is a flowchart showing processing performed in the camera 100 when encoding light field data acquired by the plenoptic camera.

First, an acquisition unit 103 acquires light field RAW data output from the light field imaging unit 102, and outputs the light field RAW data to an image processing unit 104 (step S801).

The image processing unit 104 generates (four) light field data by demosaicing the light field RAW data, and outputs the generated light field data to an LF (Light Field) encoding unit 105 (step S802).

The LF encoding unit 105 performs encoding processing of the light field data. First, to reduce the redundancy between viewpoints from the light field data, the corresponding relationship of pixels between the viewpoints (viewpoints a, b, c, and d) is determined. The corresponding relationship is determined by designating the focus position of a refocus image (step S803).

When the operation unit 101 is set to the refocus mode that adjusts the focus position after shooting, the user inputs an optimum focus position after imaging. For example, using the touch panel function, the user designates the focus position on the image displayed on the liquid crystal display of the display unit 405, thereby inputting to the operation unit 101. The focus position can also be designated using another method of, for example, presenting images of a plurality of focus positions and causing the user to select one of them, as a matter of course. If the refocus mode is not set, processing is performed assuming that a default focus position (in this embodiment, parallax 0 to be described later) is designated.

Figure 9A:
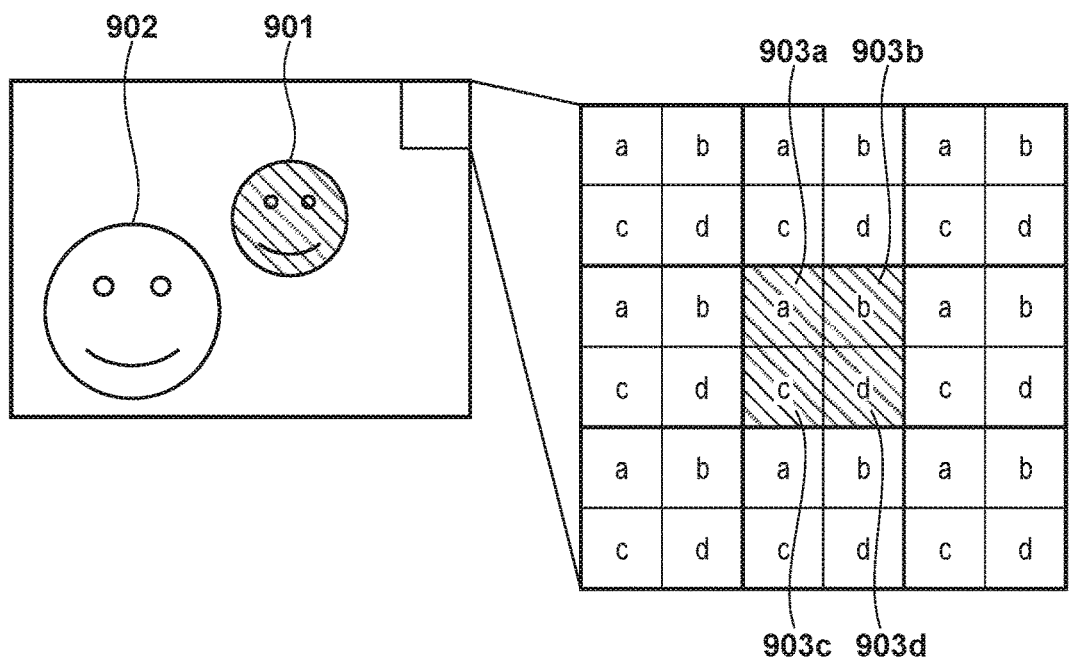
FIGS. 9A and 9B are views showing a method of generating a refocus image from light field data.
Figure 9B:
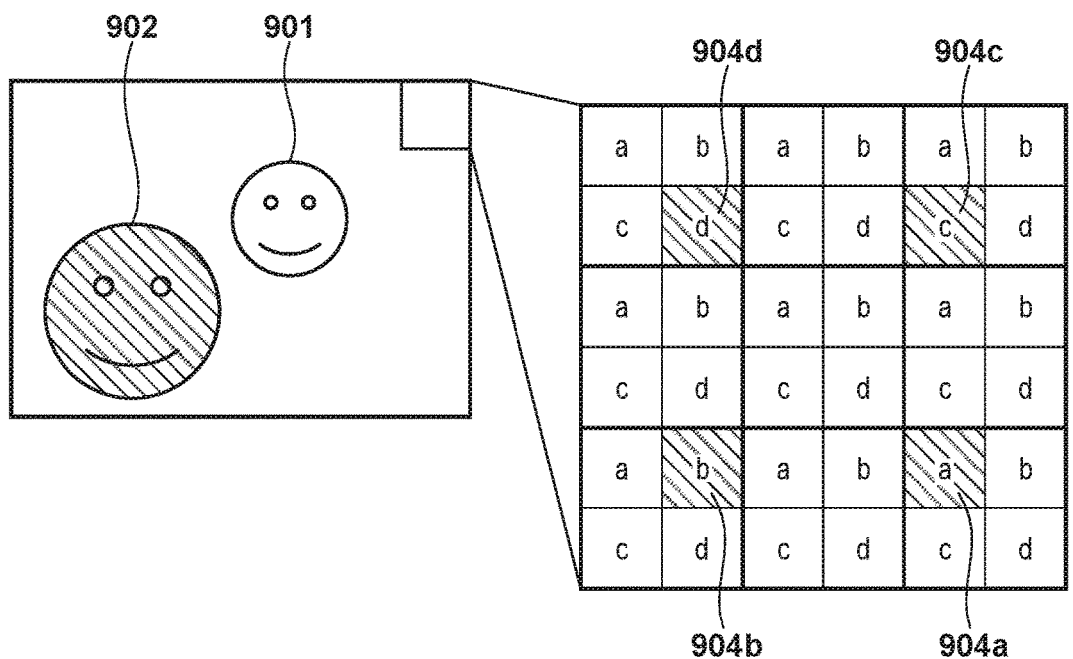

The refocus image is an image formed by compositing the corresponding pixels between the viewpoints (viewpoints a, b, c, and d) of the light field data and focused at a designated position. A method of determining the corresponding pixels between viewpoints in light field data will be described with reference to FIGS. 9A and 9B. FIGS. 9A and 9B show an example in which an object 901 is arranged on the far side and an object 902 is arranged on the near side. An explanation will be made below assuming that imaging is performed while setting focus on the object 901.

Corresponding pixels in case where a refocus image is generated from light field data without changing the focus position will be described with reference to FIG. 9A. That is, a case where no focus position change instruction is input in step S803 will be described.

FIG. 9A shows, on the right side, a state in which the pixels at the same position out of the images a to d of the four viewpoints of the light field data are arrayed in 2×2. Reference numeral 903a in FIG. 9A denotes a certain pixel in the image a after demosaicing, which includes three components. That is, use caution not to confuse a, b, c, and d on the right side of FIG. 9A and a, b, c, and d on the right side of FIG. 7B because they have different meanings.

Four pixels 903a, 903b, 903c, and 903d divided into 2×2 in FIG. 9A are pixels (corresponding pixels) corresponding to each other, and the color values (here, R, G, and B) of the four pixels are averaged to form one pixel of the refocus image. The average of the color values of four pixels is calculated using a similar corresponding relationship in all pixels of the viewpoints a, b, c, and d, and the pixels are arrayed, thereby generating a refocus image. In this embodiment, the corresponding pixels shown in FIG. 9A will be referred to as "corresponding pixels of parallax 0", and the refocus image will be referred to as a "refocus image of parallax 0". That is, when no focus position change instruction is input in step S803, the "corresponding pixels of parallax 0" are set by default. The "corresponding pixels of parallax 0" are also set when the focus position is not changed because, for example, the operation unit 101 is not set to the refocus mode.

Processing performed when generating a refocus image focused on the object 902 by changing the focus position will be described next with reference to FIG. 9B. This is processing in case where a focus position change instruction is input in step S803.

In this case, the light field data have a parallax. An example of a method of obtaining the parallax is as follows.

First, a binary image representing the contract level is generated for each viewpoint image. Matching processing is performed to determine a portion of the binary images of two viewpoints, where the binary image of the object corresponding to a position designated by the user is located. For example, the images of the viewpoints a and b can be regarded as having a parallax in the horizontal direction, and the parallax in the horizontal direction is obtained. This processing is performed for the images of the viewpoints a, b, c, and d.

For example, assume that a pixel 904a in the image a, a pixel 904b in the image b, a pixel 904c in the image c, and a pixel 904d in the image d are corresponding pixels, as shown in FIG. 9B. In this case, the color values of the four pixels are averaged to form one pixel of the refocus image. The average of the color values of four pixels is calculated using a similar corresponding relationship in all pixels of the viewpoints a, b, c, and d, and the pixels are arrayed, thereby generating a refocus image.

The above processing indicates shifting the pixel groups of the viewpoints (viewpoints a, b, c, and d) by a designated parallax amount to obtain corresponding pixels. Consider the corresponding points 903a, 903b, 903c, and 903d of parallax 0 as a reference. The pixel 904a is shifted to the lower right side of the pixel 903a, the pixel 904b is shifted to the lower left side of the pixel 903b, the pixel 904c is shifted to the upper right side of the pixel 903c, and the pixel 904d is shifted to the upper left side of the pixel 903d by one pixel. In this embodiment, the corresponding pixels shown in FIG. 9B will be referred to as "corresponding pixels of parallax 1", and the refocus image will be referred to as a "refocus image of parallax 1".

When generating a refocus image focused on a side farther than the object 902, the shift directions of the pixel groups of the viewpoints are reversed. That is, when the focus position is to be changed in step S803, "corresponding pixels of parallax N" (N is an integer) are set by shifting the parallax amount according to the focal position (step S804).

In this embodiment, inter-viewpoint wavelet transform is performed for the corresponding pixels set by the above processing to reduce the redundancy between the viewpoints (step S805). Inter-viewpoint wavelet transform means wavelet transform of corresponding pixels between viewpoints in light field data. This will be described with reference to FIG. 9A. Wavelet transform is performed for the corresponding pixels 903a, 903b, 903c, and 903d. Here, Haar wavelet transform is used, which is represented by $$L \text{ (low frequency component)} = (Xa+Xb)/2 \quad (1)$$

$$H \text{ (high frequency component)} = (Xa-Xb)/2 \quad (2)$$

where Xa and Xb represent two pixels adjacent in a one-dimensional direction. In the embodiment, equations (1) and (2) are extended to the corresponding pixels 903a to 903d that are two-dimensionally arrayed in 2×2. Hence, Haar wavelet transform is performed in each of the horizontal and vertical directions.

Inter-viewpoint wavelet transform will be described with reference to FIGS. 10A and 10B. FIG. 10A shows an example in which the four corresponding pixels are rearranged in 2×2 so as to be adjacent to each other. In the refocus image of parallax 0, FIG. 10A equals FIG. 9A. Note that in the refocus image of parallax 1, the 2×2 pixels a, b, c, and d in FIG. 10A correspond to the pixels 904a to 904d in FIG. 9B. Inter-viewpoint Haar wavelet transform according to this embodiment in the array shown in FIG. 10A is represented by $$R \text{ component} = (a+b+c+d)/4 \quad (3)$$

$$d1 \text{ component} = ((a+c)-(b+d))/4 \quad (4)$$

$$d2 \text{ component} = ((a+b)-(c+d))/4 \quad (5)$$

$$d3 \text{ component} = ((a+d)-(b+c))/4 \quad (6)$$

In equation (3), "R component" means not an "R" color component but a pixel (formed from the average value of the three color components) of the refocus image. Note that the expression "component" is used merely for the sake of convenience because four components are generated by two-dimensional wavelet transform.

FIG. 10B shows disassembled components after inter-viewpoint wavelet transform. The pixel values a, b, c, and d are disassembled into the R component (average component), the d1 component (difference component), the d2 component (difference component), and the d3 component (difference component). At this time, the R component is the "refocus image of parallax N" or the "refocus image of parallax 0" in the example of FIG. 9A.

In this embodiment, the number of viewpoints is 4. The number of average components is 1, and the number of difference components is 3. The total number of components is 4. That is, both the number of viewpoints and the total number of components are 4 and match each other. The d1 component represents a horizontal parallax, and the d2 component represents a vertical parallax. Inter-viewpoint wavelet transform for corresponding pixels having a parallax as shown in FIG. 9B is performed by the same processing as described above.

Since the encoded data of light field data is partially decoded using the above-described features, it is possible to effectively cope with various processing requests from the user for refocus processing, depth estimation processing, stereo vision, naked eye stereo vision, and the like. Details of decoding processing will be described later.

Next, wavelet transform within the screen is performed for the disassembled components after inter-viewpoint wavelet transform. Wavelet transform in this case need not always be Haar wavelet transform and can be wavelet transform employed in JPEG 2000 or the like. That is, wavelet transform is performed for each of the R component, the d1 component, the d2 component, and the d3 component. This will be described with reference to FIGS. 10A to 10D. FIG. 10B shows disassembled components after inter-viewpoint wavelet transform. FIG. 10C shows the disassembled components rearranged for each type. When wavelet transform is performed in each of the horizontal and vertical directions for each of the disassembled components (R component, d1 component, d2 component, and d3 component), each disassembled component is disassembled into wavelet coefficients (LL component, HL component, LH component, and HH component), as shown in FIG. 10D (step S806).

The wavelet coefficients (LL component, HL component, LH component, and HH component) shown in FIG. 10D are quantized and entropy-encoded (step S807). Although wavelet transform is used to transform of each disassembled component here, any other spatial frequency conversion such as DCT may be used.

A standard encoding technique such as JPEG 2000 may be used in steps S806 and S807. When JPEG 2000 is used, each of the disassembled components (R component, d1 component, d2 component, and d3 component) is used as the input of JPEG 2000, as shown in FIG. 10C. In this embodiment, the entropy-encoded light field data will be referred to as compressed light field data.

The LF encoding unit 105 outputs the compressed light field data to the output unit 106 (step S808).

The output unit 106 outputs the compressed light field data to the storage unit 107 to store the data. The stored compressed light field data is output, via the I/O interface 108, to a device outside the camera as an encoded data file.

Figure 21:
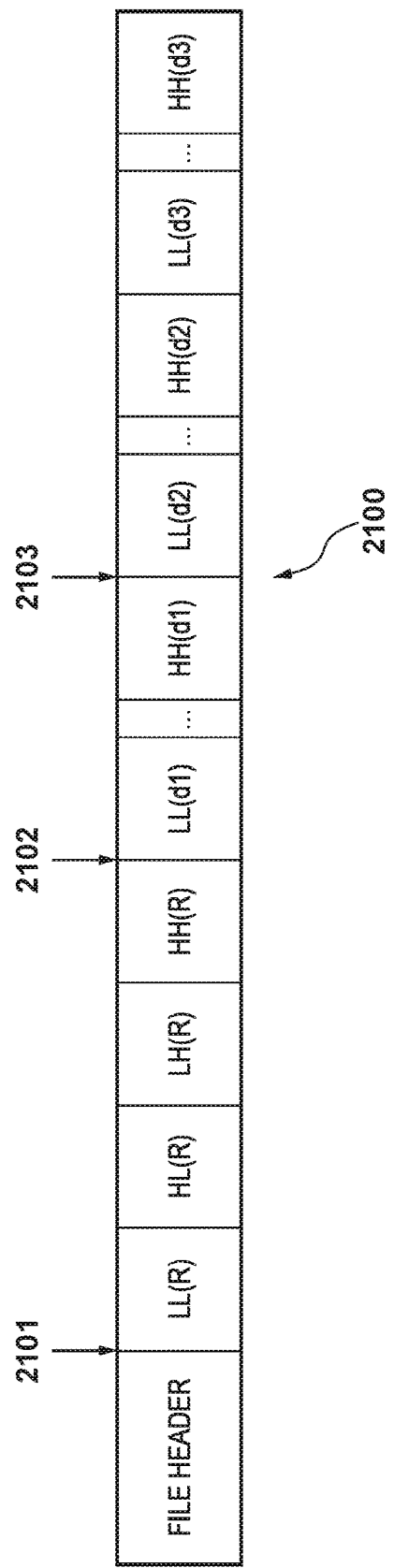
FIG. 21 is a view showing the data structure of an encoded data file according to the embodiment.

FIG. 21 is a view showing the data structure of an encoded data file 2100 output from the output unit 106. As shown in FIG. 21, the file header stores data (the numbers of horizontal and vertical pixels of the refocus image, the number of bits of each color component, and the like) necessary for decoding processing. The data also includes the addresses of the storing positions of encoded data LL(R), LL(d1), and LL(d2) indicated by arrows 2101, 2102, and 2103 in FIG. 21. Each address enables intervening decoding processing from corresponding encoded data. The reason for this will be clarified in an explanation of an image decoding apparatus later. Note that if the file header has a fixed length, the encoded data LL(R) is guaranteed to be located immediately after the file header. Hence, the start address 2101 of the encoded data LL(R) need not be stored in the file header.

Figure 2:
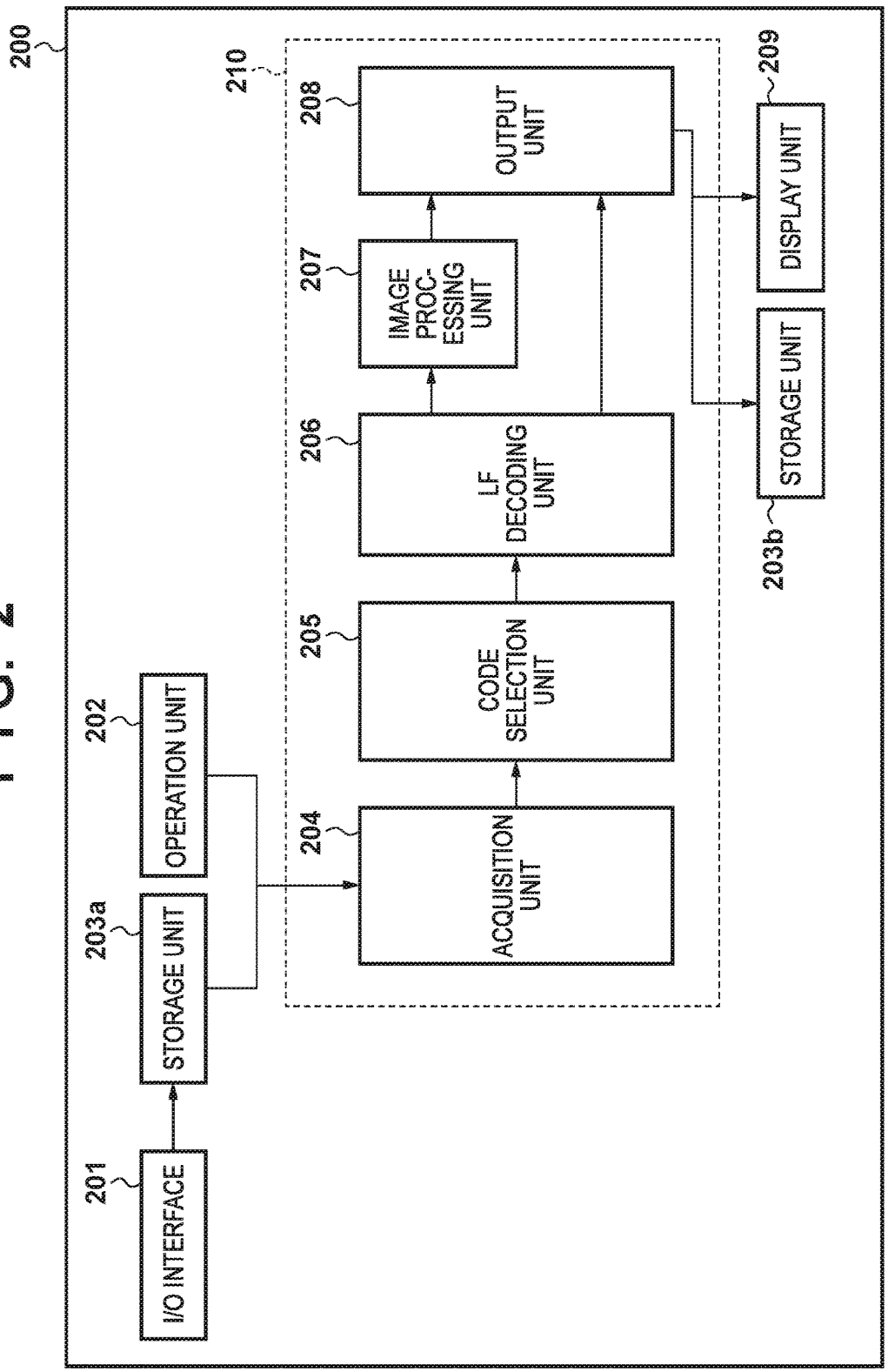
FIG. 2 is a block diagram showing an example of the arrangement of an image decoding apparatus according to the first embodiment.

An image decoding apparatus according to this embodiment will be described below. FIG. 2 is a block diagram showing an example of the arrangement of the image decoding apparatus according to the first embodiment.

An image decoding apparatus 200 includes an I/O interface 201, an operation unit 202, storage units 203a and 203b, an information processing unit 210, and a display unit 209. The image decoding apparatus 200 is a computer or a plenoptic camera. In this embodiment, a description will be made assuming that the image decoding apparatus 200 is a computer.

The I/O interface 201 includes a USB connector, like the I/O interface 108. The image decoding apparatus 200 acquires, via the I/O interface 201, an encoded data file (see FIG. 21) of light field data output from the I/O interface 108 of the camera 100.

The storage unit 203a is a nonvolatile storage medium such as a memory card capable of storing the encoded data file acquired from the I/O interface 201. The storage unit 203b stores image data of the encoding result output from an output unit 208. Note that FIG. 2 shows an example in which the two storage units 203a and 203b are provided. However, a single storage medium may be shared as the storage units 203a and 203b. The operation unit 202 is an input device such as a keyboard or a mouse provided on the computer. The user can input an instruction to do refocus processing, stereo vision, naked eye stereo vision, or depth estimation by operating the operation unit 202. The display unit 209 displays a shot image or characters. In addition to a normal liquid crystal display, stereo vision display or naked eye stereo vision display is used. The internal arrangement of the information processing unit 210 is the same as that of the information processing unit 109 shown in FIG. 4. A ROM in the information processing unit 210 stores a program shown in the flowchart of FIG. 11. Reference numerals 204 to 208 in FIG. 2 denote components implemented by causing the CPU in the information processing unit 210 to execute the program (corresponding to the flowchart of FIG. 11) stored in the ROM. Processing of the information processing unit 210 according to this embodiment will be described below.

Figure 11:
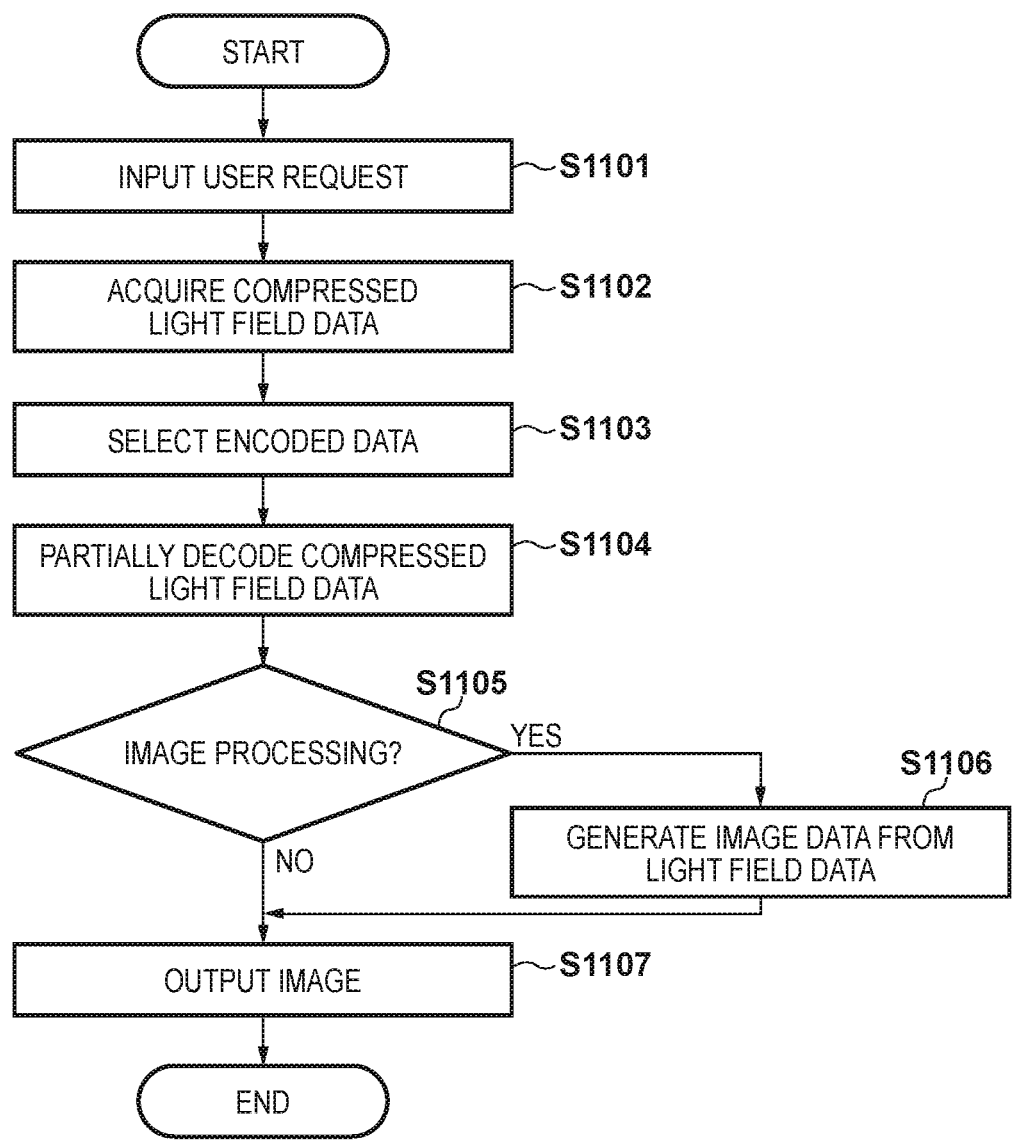
FIG. 11 is a flowchart showing an example of decoding processing performed in the first embodiment.

FIG. 11 is a flowchart showing processing performed in the image decoding apparatus 200 when decoding compressed light field data.

First, the acquisition unit 204 acquires a user request from the operation unit 202. The user request is performing, for example, refocus processing, stereo vision, naked eye stereo vision, or depth estimation from light field data. Any other request to, for example, control the depth of field may be acquired as long as the processing is image processing using light field data, as a matter of course. The user request is sent to the code selection unit 205 (step S1101).

The acquisition unit 204 acquires an encoded data file output from the storage unit 203$a$, and outputs compressed light field data to the code selection unit 205 (step S1102). In this embodiment, a case where the R component in the compressed light field data is a "refocus image of parallax 0" will be described.

The code selection unit 205 selects, based on the user request, partial encoded data to be decoded from the encoded light field (step S1103). The addresses 2101 to 2103 shown in FIG. 21 are used for the selection.

The light field decoding unit 206 decodes the selected partial encoded data (step S1104). It is determined based on a user instruction whether to perform image processing by the image processing unit 207 (step S1105). If necessary, the image processing unit 207 performs image processing (step S1106). The output unit 208 performs processing of outputting the image of the decoding result or an image obtained by performing image processing for the decoding result to the display unit 209 or storing the image in the storage unit 203$b$ (step S1107).

Partial encoded data selection processing (step S1103) according to a user request will be described below with reference to FIG. 10C. One of processes 1 to 6 below is selected in accordance with the user request.

Process 1: When the user request is refocus processing without changing the focus position In this case, the encoded data of the R component is selected as the partial encoded data to be decoded. The encoded data of the remaining components d1, d2, and d3 are non-decoding targets.

Process 2: When the user request is refocus processing by changing the focus position The encoded data of the R component, the d1 component, the d2 component, and the d3 component are selected as the partial encoded data to be decoded.

Process 3: When the user request is stereo vision

In this case, two images of two different viewpoints in the horizontal direction need to be generated. In other words, the parallax in the vertical direction can be neglected. For this reason, the encoded data of the R component and the d1 component are selected as the partial encoded data to be decoded.

Process 4: When the user request is naked eye stereo vision

In this case, the encoded data of the R component, the d1 component, the d2 component, and the d3 component are selected as partial encoded data. If only viewpoints in the horizontal direction exist, the encoded data of the R component and the d1 component are selected as partial encoded data.

Process 5: When the user request is depth estimation to estimate the parallax in the horizontal direction In this case, the encoded data of the R component and the d1 component are selected as the partial encoded data to be decoded.

Process 6: When the user request is depth estimation to estimate the parallax in the vertical direction In this case, the encoded data of the R component and the d2 component are selected as the partial encoded data to be decoded. Parallax estimation in the vertical direction is used when the parallax amount in the vertical direction is effective as in body height estimation.

The partial encoded data of the encoded light field data selected by the above processing is supplied to the LF (Light Field) decoding unit 206.

The LF decoding unit 206 decodes the partial encoded data of the compressed light field data (step S1104). By inverse Haar wavelet transform in a one-dimensional direction, this is represented by $$a = L + H \quad (7)$$

$$b = L - H \quad (8)$$

Equations (7) and (8) are equation for one dimension. In the embodiment, since inverse inter-viewpoint wavelet transform for four pixels is performed in the two-dimensional directions. Hence, the transform is represented not by equations (7) and (8) but by $$a = R\ \text{component} + d1\ \text{component} + d2\ \text{component} + d3\ \text{component} \quad (9)$$

$$b = R\ \text{component} - d1\ \text{component} + d2\ \text{component} - d3\ \text{component} \quad (10)$$

$$c = R\ \text{component} + d1\ \text{component} - d2\ \text{component} - d3\ \text{component} \quad (11)$$

$$d = R\ \text{component} - d1\ \text{component} - d2\ \text{component} + d3\ \text{component} \quad (12)$$

As a result, the light field data (images of four viewpoints) are reconstructed. Partial decoding processing by the LF decoding unit 206 and output from the output unit 208 for the compressed light field data in response to the user request will be described here with reference to FIG. 10C.

Process 1: When the user request is refocus processing without changing the focus position In this case, only the encoded data of the R component is selected as the partial encoded data to be decoded. Hence, the LF decoding unit 206 decodes only the encoded data of the R component. Since the decoding result is the "refocus image of parallax 0", as indicated by equation (3), the output unit 208 directly outputs the decoding result of the LF decoding unit 206.

Process 2: When the user request is refocus processing by changing the focus position All the encoded data of the R component, the d1 component, the d2 component, and the d3 component are selected as the data to be decoded. Hence, the LF decoding unit 206 decodes the R component, the d1 component, the d2 component, and the d3 component. The LF decoding unit 206 also performs inverse inter-viewpoint wavelet transform represented by equations (9) to (12) for the corresponding pixels of the decoded R component, the d1 component, the d2 component, and the d3 component, thereby generating four images (light field data) of the viewpoints a, b, c, and d. The image processing unit 207 generates a refocus image at the focus position designated by the user from the images of the viewpoints a, b, c, and d. The output unit 208 outputs the refocus image generated by the image processing unit 207. Note that the refocus image generation method is the same as that described concerning step S804.

Process 3: When the user request is stereo vision

At this time, the partial encoded data of the R component and the d1 component are selected as data to be decoded, and the partial encoded data of the d2 component and the d3 component are not selected as data to be decoded. Hence, inverse inter-viewpoint wavelet transform is performed regarding the values of the d2 and d3 components as 0. The images of the viewpoints a, b, c, and d are generated. At this time, the images of the viewpoints a and c are identical to each other, and the images of the viewpoints b and d are identical to each other. That is, in reality, the LF decoding unit 206 need only generate the images of the viewpoints a and b, and equations (11) and (12) need not be calculated. Note that the images of the viewpoints c and d may be generated and output.

This will be described with reference to FIG. 7A. The images of the viewpoints a and c are images generated by light beams that have passed through a region that combines the regions a and c of the virtual lens 601. The images of the viewpoints b and d are images generated by light beams that have passed through a region that combines the regions b and d of the virtual lens 601. That is, the generated images a and b are suitable for stereo vision because of the large light amount and little noise, unlike the images a and b at the time of imaging. The output unit 208 outputs the generated stereo vision images (images of the viewpoints a, and c).

Process 4: When the user request is naked eye stereo vision

All the partial encoded data of the R component, the d1 component, the d2 component, and the d3 component are selected as data to be decoded. Hence, the LF decoding unit 206 decodes all the partial encoded data. The LF decoding unit 206 also calculates equations (9) to (12) and obtains the images of the viewpoints a, b, c, and d.

The image processing unit 207 performs free viewpoint image composition of viewpoints according to the number of viewpoints of a naked eye stereo vision display from the generated images of the viewpoints a, b, c, and d. For example, if the naked eye stereo vision display has eight viewpoints in the vertical direction and eight viewpoints in the horizontal direction, that is, a total of 64 viewpoints, the images of the viewpoints a, b, c, and d are selected, and 60 viewpoints among the viewpoints a, b, c, and d are generated by free viewpoint image composition, thereby outputting image data of a total of 64 viewpoints including eight viewpoints in the vertical direction and eight viewpoints in the horizontal direction. If the viewpoints exist only in the horizontal direction, the image processing unit 207 performs free viewpoint image composition of viewpoints according to the number of viewpoints of the naked eye stereo vision display from the generated images of the viewpoints a, b, c, and d. For example, if the naked eye stereo vision display has eight viewpoints in the horizontal direction, the images of the viewpoints a and b are selected, six viewpoints between the viewpoints a and b are generated by free viewpoint image composition, thereby outputting image data of eight viewpoints in the horizontal direction. A description of the method of free viewpoint image composition will be omitted here. The output unit 208 outputs the thus generated images.

Process 5: When the user request is depth estimation to estimate the parallax in the horizontal direction The encoded data of the R component and the d1 component are selected as the partial encoded data to be decoded. That is, the same decoding processing as in process 3 is performed. On the other hand, the image processing unit 207 generates a depth map by stereo matching processing of two images obtained by decoding and having a parallax along the horizontal axis, and the output unit 208 outputs the depth map. This also applies to a case where a depth map is generated from the viewpoints c and d.

Process 6: When the user request is depth estimation to estimate the parallax in the vertical direction The partial encoded data of the R component and the d2 component are selected as data to be decoded. Hence, the LF decoding unit 206 performs decoding processing of the R component and the d2 component. At this time, the values of the d1 component and the d3 component are set to 0. Inverse inter-viewpoint wavelet transform is performed for the corresponding pixels of the R component, the d1 component, the d2 component, and the d3 component, thereby acquiring the images of the viewpoints a, b, c, and d. At this time, the images of the viewpoints a and b are identical and the images of the viewpoints c and d are identical. This will be described with reference to FIG. 7A. The images of the viewpoints a and b are images generated by light beams that have passed through a region that combines the regions a and b of the virtual lens 601. The images of the viewpoints c and d are images generated by light beams that have passed through a region that combines the regions c and d of the virtual lens 601. That is, the generated images a and c are suitable for parallax estimation in the vertical direction because of the large light amount and little noise, unlike the images a and c at the time of imaging.

The image processing unit 207 generates a depth map by stereo matching of two images obtained by decoding and having a parallax along the vertical axis, and the output unit 208 outputs the depth map. The viewpoints b and d may be selected, as a matter of course. A description of the method of stereo matching will be omitted here.

In the above-described example of the image decoding apparatus, the compressed light field data is stored in the storage unit 203a of the image decoding apparatus 200. As the next example of the image decoding apparatus, a case where the compressed light field data is recorded on a server will be described. In this example, a request from a user device is input, compressed light field data is decoded, and generated image data is output to the user device.

Figure 3:
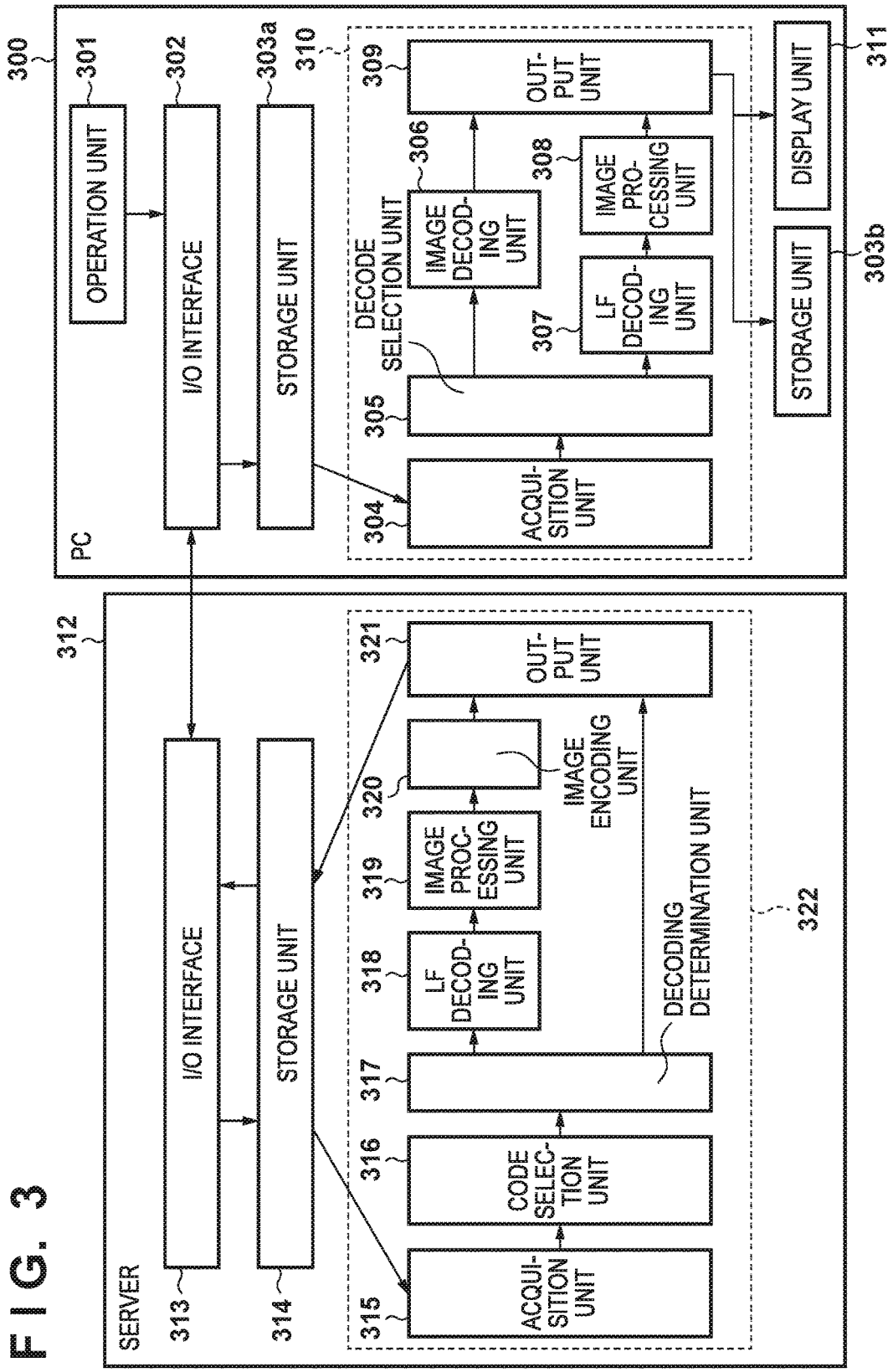
FIG. 3 is a block diagram showing an example of the arrangement of an image decoding apparatus.

FIG. 3 is a block diagram showing an example of the arrangement of an image decoding system according to the first embodiment. A computer 300 that is a user device includes an operation unit 301, an I/O interface 302, a storage unit 303, an information processing unit 310, and a display unit 311. On the other hand, a server 312 includes an I/O interface 313, a storage unit 314, and an information processing unit 322. The I/O interfaces 302 and 313 are connected by LAN. The computer 300 acquires, via the I/O interface 302, encoded data output from the I/O interface 313 of the server 312. The server 312 acquires, via the I/O interface 313, a user request output from the I/O interface 302 of the computer 300.

Each of the storage units 303 and 314 is a nonvolatile storage medium such as a memory card capable of storing compressed light field data. The operation unit 301 is an input device such as a keyboard or a mouse provided on the computer. The user can input an instruction to do refocus processing, stereo vision, naked eye stereo vision, or depth estimation by operating the operation unit 301. The display unit 311 displays a shot image or characters. In addition to a normal liquid crystal display, stereo vision display or naked eye stereo vision display is used. The internal arrangement of each of the information processing units 310 and 322 is the same as that of the information processing unit 109 shown in FIG. 4. A ROM in each of the information processing units 310 and 322 stores a program shown in the flowchart of FIG. 12.

Processing of the information processing units 310 and 322 according to this embodiment will be described below. The following explanation will be made assuming that the user operates the computer 300 and selects one of compressed light field data in a database stored in the storage unit 314 of the server 312.

FIG. 12 is a flowchart showing processing performed in the computer 300 and the server 312 when decoding compressed light field data. To clarify which one of the information processing units 310 and 322 performs a process, reference numeral 310 or 322 is added to a broken line surrounding the process.

First, an acquisition unit 315 acquires a user request. The user request is performing, for example, refocus processing, stereo vision, naked eye stereo vision, or depth estimation from light field data. The user request is input from the operation unit 301 and acquired by the acquisition unit 315 via the I/O interfaces 302 and 313. The user request is sent to a code selection unit 316 (step S1201).

The acquisition unit 315 acquires compressed light field data output from the storage unit 314, and outputs the compressed light field data to the code selection unit 316 (step S1202).

The code selection unit 316 selects, based on the user request, partial encoded data to be decoded from the compressed light field data (step S1203). This selection processing is the same as selection processes 1 to 6 of the code selection unit 205 described above, and a detailed description thereof will be omitted here.

A decoding determination unit 317 determines whether to decode the compressed light field data in the server 312 or output partial encoded data of the compressed light field data (step S1204). Upon determining to do decoding in the server 312, the decoding determination unit 317 outputs the selected partial encoded data to an LF decoding unit 318 and causes it to decode the partial encoded data. Upon determining not to do decoding, the decoding determination unit 317 outputs the selected partial encoded data to an output unit 321. The output unit 321 transmits the data given by an image encoding unit 320 or the decoding determination unit 317 to the computer 300 of the user.

Here, the decoding determination unit 317 determines to output the compressed light field data to the LF decoding unit 318 if the request from the computer 300 of the user is one of i to iii below. The LF decoding unit 318 decodes the partial encoded data of the compressed light field data (step S1205).

i). When the request is refocus processing by changing the focus position

In this case, all partial encoded data are selected as partial encoded data to be decoded, and decoded by the LF decoding unit 318.

ii). When the request is depth estimation to estimate the parallax in the horizontal direction In this case, the partial encoded data of the R component and the d1 component are selected as the partial encoded data to be decoded, and decoded by the LF decoding unit 318.

iii). When the user request is depth estimation to estimate the parallax in the vertical direction In this case, the partial encoded data of the R component and the d2 component are selected as the partial encoded data to be decoded, and decoded by the LF decoding unit 318.

If the request from the computer 300 of the user is one of iv to vi below, the partial encoded data of the compressed light field data is output to the output unit 321.

iv). When the request is refocus processing without changing the focus position

In this case, the encoded data of the R component is output to the output unit 321.

v). When the request is stereo vision

Encoded data of the R component and the d1 component are selected as the partial encoded data and output to the output unit 321.

vi). When the request is naked eye stereo vision

Encoded data of the R component, the d1 component, the d2 component, and the d3 component are selected as partial encoded data and output to the output unit 321. Note that if viewpoints exist only in the horizontal direction, the encoded data of the R component and the d1 component are selected as partial encoded data and output to the output unit 321.

The LF decoding unit 318 generates light field data by decoding the input partial encoded data and outputs it to an image processing unit 319.

The image processing unit 319 performs image processing for the given light field data (step S1206). Details of the processing are as follows.

i). When the request is refocus processing by changing the focus position

The image processing unit 319 generates a refocus image at the focus position designated by the user from the four images (light field data) of the viewpoints a, b, c, and d obtained by decoding. That is, a refocus image of parallax N is generated.

ii). When the request is depth estimation to estimate the parallax in the horizontal direction The LF decoding unit 318 generates two images having a parallax along the horizontal axis. Hence, the image processing unit 319 generates a depth map by stereo matching processing and outputs the depth map data as image data.

iii). When the request is depth estimation to estimate the parallax in the vertical direction The LF decoding unit 318 generates two images having a parallax along the vertical axis. Hence, the image processing unit 319 generates a depth map by stereo matching processing and outputs the depth map data as image data.

The image data generated in the above-described way is sent to the image encoding unit 320. The image encoding unit 320 encodes the generated image data (step S1207). The encoding processing can be conventional encoding processing such as JPEG, JPEG 2000, or PNG. Finally, the generated image data is output to the output unit 321.

With the above-described processing, the server 312 transmits, to the computer 300 of the user, one of the encoded light field data directly output from the decoding determination unit 317 or encoded image data from the image encoding unit 320 (step S1208).

In the conventional method, encoded light field data or generated image data is transmitted. In the method according to this embodiment, it is only necessary to transmit generated image data or partial data of encoded light field data in response to a user request such as refocus processing, stereo vision, naked eye stereo vision, or depth estimation processing. In terms of data transmission, high-speed transmission is possible because partial data is transmitted. In terms of image generation, an image can be generated by a small amount of calculation because image processing is performed from partial decoding.

Processing in the computer 300 of the user will be described next. An acquisition unit 304 acquires the encoded image data or the partial encoded data of the compressed light field data transmitted from the output unit 321 of the server 312. The data output from the output unit 321 is acquired by the acquisition unit 304 via the I/O interfaces 313 and 302 (step S1209).

The acquisition unit 304 outputs the encoded image data or the partial encoded data of the compressed light field data to a decode selection unit 305.

The decode selection unit 305 determines whether to decode the compressed light field data in the computer 300 or decode the image data, and based on the determination result, outputs the received encoded data to one of an image decoding unit 306 and an LF decoding unit 307 (step S1210).

As is apparent from the above description, if the user request is one of i to iii below, the received encoded image data is an image that is completed in itself and is therefore output to the image decoding unit 306.

i). Response to a request of refocus processing by changing the focus position

In this case, the image decoding unit 306 outputs the image obtained by decoding to an output unit 309 as a "refocus image of parallax N" (step S1211). The decoding processing here is the same as the conventional decoding processing such as JPEG, JPEG 2000, or PNG.

ii). Response to a request of depth estimation to estimate the parallax in the horizontal direction In this case, the image decoding unit 306 outputs the image obtained by decoding to the output unit 309, assuming that it is a "depth map".

iii). Response to a request of depth estimation to estimate the parallax in the vertical direction In this case, the image decoding unit 306 outputs the image obtained by decoding to the output unit 309, assuming that it is a "depth map".

On the other hand, if the user request is one of iv to vi below, assuming that the received encoded image data is partial encoded data of light field data, the decode selection unit 305 outputs the data to the LF decoding unit 307 and causes it to decode the data (step S1212).

iv). Response to a request of refocus processing without changing the focus position In this case, the received encoded data is the partial encoded data of the R component. The LF decoding unit 307 decodes a "refocus image of parallax 0".

v). Response to a request of stereo vision

The received encoded data includes the partial encoded data of the R component and the d1 component. Hence, regarding the d2 and d3 components as 0, the images of the viewpoints a, b, c, and d are generated.

vi). Response to a request of naked eye stereo vision

In this case, the received encoded data includes the encoded data of the R component, the d1 component, the d2 component, and the d3 component. Hence, the LF decoding unit 307 decodes all the partial encoded data and generates the images of the viewpoints a, b, c, and d.

An image processing unit 308 performs image processing for the light field data decoded by the LF decoding unit 307 (step S1213). The image processing here is as follows.

Response to a request of refocus processing without changing the focus position

The generated "refocus image of parallax 0" is output to the output unit 309.

Response to a request of stereo vision

The images of the viewpoints a and b are selected from the generated images of the viewpoints a, b, c, and d and output to the output unit 309 as a stereo image. The viewpoints c and d may be selected, as a matter of course.

Response to a request of naked eye stereo vision

Free viewpoint image composition of viewpoints according to the number of viewpoints of a naked eye stereo vision display is performed from the generated images of the viewpoints a, b, c, and d. Processing concerning free viewpoint image composition can be the same as that already described, and a description thereof will be omitted here.

The output unit 309 outputs the image data generated in the above-described way to the storage unit 303 or the display unit 311 (step S1214).

According to this embodiment, with the above-described encoding processing and decoding processing, image processing such as refocus processing, stereo vision, naked eye stereo vision, or depth estimation can be implemented by a small data amount and a small calculation amount.

Second Embodiment

In the first embodiment, an image encoding apparatus has been described, which generates light field data by demosaicing light field RAW data acquired by a plenoptic camera and encodes the light field data. In addition, an image decoding apparatus has been described, which decodes partial data of compressed light field data in response to a user request and outputs image data.

In the second embodiment, an image encoding apparatus that encodes light field RAW data acquired by a plenoptic camera and an image decoding apparatus that decodes partial data of compressed light field data in response to a user request will be explained.

In the second embodiment as well, the image encoding apparatus is mounted on a camera 100 shown in FIG. 1, and has the same arrangement. Hence, the internal arrangement of an information processing unit 109 is also the same as in the first embodiment except the programs stored in the ROM of the information processing unit 109. That is, encoding processing according to the second embodiment is performed in accordance with the flowchart of FIG. 13 in place of FIG. 8. Details of processing of the information processing unit 109 according to the second embodiment will be explained with reference to the flowchart of FIG. 13. FIG. 13 illustrates encoding processing of light field RAW data acquired by a plenoptic camera.

First, an acquisition unit 103 acquires light field RAW data output from a light field imaging unit 102, and outputs the acquired light field RAW data to an image processing unit 104 (step S1301).

The image processing unit 104 divides the light field RAW data into color components and outputs the light field RAW data to an LF (Light Field) encoding unit 105 (step S1302).

The image sensor has the RGB arrangement of the Bayer pattern, as shown in FIG. 7B. Each of the R, G, and B colors is divided into 2×2=4 pixels, and each pixel is expressed by 14 bits. One color component may be expressed by another number of bits such as 10 bits or 12 bits by dynamic range compression, as a matter of course.

The light field RAW data division method according to the second embodiment will be described here with reference to FIGS. 14A to 14D. In the color component division, pixels are arrayed for each of the R0 component, G0 component, G1 component, or B0 component, and image data of each color component is formed. That is, as shown in FIGS. 14A to 14D, 2×2 multi-viewpoint images are generated for each of the color components (R0 component, G0 component, G1 component, and B0 component).

The image processing unit 104 outputs the light field RAW data divided for each of the color components (R0 component, G0 component, G1 component, and B0 component) to the LF encoding unit 105.

Regarding 2×2 data in light field RAW data of each of the color components (R0 component, G0 component, G1 component, and B0 component), for example, pixels 1401a, 1401b, 1401c, and 1401d of the G0 component shown in FIG. 14A as pixels corresponding to the 2×2 pixels a, b, c, and d shown in FIG. 10A, the LF encoding unit 105 encodes the data by Haar wavelet transform. Note that although in the first embodiment, each of the pixels a, b, c, and d shown in FIG. 10A includes three color components, each of the pixels a, b, c, and d shown in FIG. 10A according to the second embodiment includes only one color component. This is because the color components are already divided into R0, G0, G1, and B0, and the data is encoded on a component basis.

The processing on a color component basis is common to steps S803 to S808 of FIG. 8 according to the first embodiment, and a description of steps S1303 to S1308 will be omitted. An output unit 106 outputs the compressed light field RAW data to a storage unit 107 to store the data. The stored compressed light field RAW data is output to a device outside the camera via an I/O interface 108.

An image decoding apparatus according to the second embodiment will be described below. FIG. 15 is a block diagram showing an example of the arrangement of the image decoding apparatus according to the second embodiment.

An image decoding apparatus 1500 includes an I/O interface 1501, an operation unit 1502, storage units 1503a and 1503b, an information processing unit 1510, and a display unit 1508. The image decoding apparatus 1500, the I/O interface 1501, the operation unit 1502, the storage units 1503a and 1503b, and the display unit 1508 have the same functions as the components denoted by reference numerals 201, 202, 203a, 203b, and 209 of the first embodiment shown in FIG. 2, and a description thereof will be omitted here.

Figure 16:
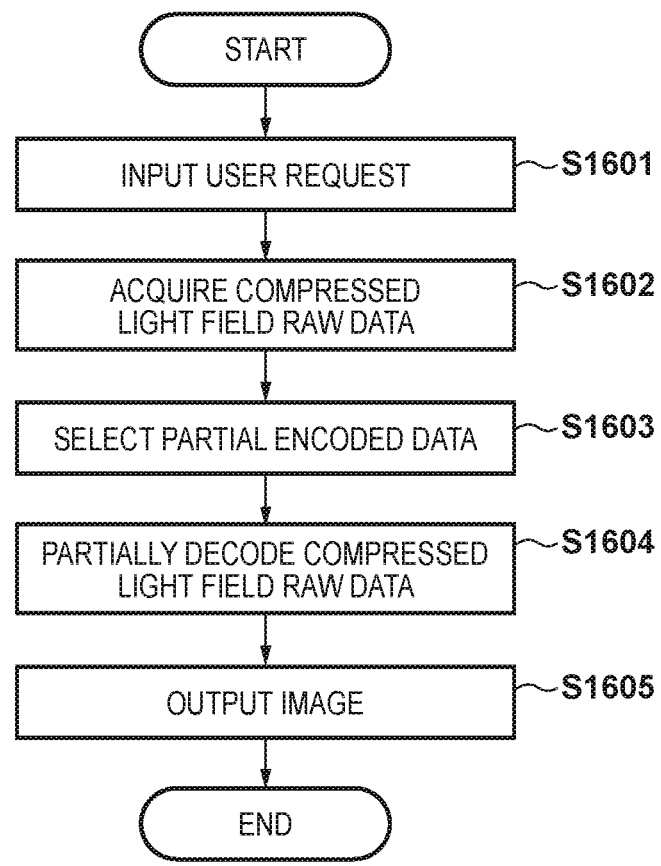
FIG. 16 is a flowchart showing an example of decoding processing performed in the second embodiment.

Processing of the information processing unit 1510 according to the second embodiment will be described below. FIG. 16 is a flowchart showing processing performed in the image decoding apparatus 1500 when decoding compressed light field RAW data.

First, an acquisition unit 1504 acquires a user request from the operation unit 1502. The user request is performing, for example, refocus processing, stereo vision, or naked eye stereo vision from light field RAW data. The user request is sent to a code selection unit 1505 (step S1601).

The acquisition unit 1504 acquires compressed light field RAW data output from the storage unit 1503a, and outputs the compressed light field RAW data to the code selection unit 1505 (step S1602). In the second embodiment, a case where the R component of each of the color components (R0 component, G0 component, G1 component, and B0 component) of the compressed light field RAW data is a "refocus image of parallax 0" will be described.

The code selection unit 1505 selects, based on the user request, partial data to be decoded from the compressed light field RAW data (step S1603). The relationship between a user request type and partial data to be selected will be described below with reference to FIG. 10C.

i). When the request is refocus processing, and the focus position is not changed Encoded data of the R component (refocus component) of each of the color components (R0 component, G0 component, G1 component, and B0 component) is selected as partial encoded data.

ii). When the request is refocus processing, and the focus position is changed

Encoded data of the R component, the d1 component, the d2 component, and the d3 component of each of the color components (R0 component, G0 component, G1 component, and B0 component) are selected as partial encoded data.

iii). When the request is stereo vision

Encoded data of the R component and the d1 component of each of the color components (R0 component, G0 component, G1 component, and B0 component) are selected as partial encoded data.

iv). When the request is naked eye stereo vision

Encoded data of the R component, the d1 component, the d2 component, and the d3 component of each of the color components (R0 component, G0 component, G1 component, and B0 component) are selected as partial encoded data. If the viewpoints exist only in the horizontal direction, the encoded data of the R component and the d1 component are selected as partial encoded data.

The partial encoded data of the compressed light field RAW data selected by the above processing is output to an LF (Light Field) decoding unit 1506. The LF decoding unit 1506 decodes the partial encoded data of the compressed light field RAW data (step S1604).

Processing of step S1604 in response to the user request will be described below.

i). When the request is refocus processing without changing the focus position

Encoded data of the R component of each of the color components (R0 component, G0 component, G1 component, and B0 component) is selected as partial encoded data. When the R component is decoded on a color component basis, RAW data of a "refocus image of parallax 0" is generated. The RAW data of the "refocus image of parallax 0" is output to an output unit 1507.

ii). When the request is refocus processing by changing the focus position

Encoded data of the R component, the d1 component, the d2 component, and the d3 component of each of the color components (R0 component, G0 component, G1 component, and B0 component) are selected as partial encoded data. When the R component, the d1 component, the d2 component, and the d3 component are decoded on a color component basis, and inverse inter-viewpoint wavelet transform is performed, RAW data of the viewpoints a, b, c, and d are generated. The RAW data of the viewpoints a, b, c, and d are output to the output unit 1507.

iii). When the request is stereo vision

Encoded data of the R component and the d1 component of each of the color components (R0 component, G0 component, G1 component, and B0 component) are selected as partial encoded data. The R component and the d1 component are decoded on a color component basis. In addition, the values of the d2 component and the d3 component are set to 0. When inverse inter-viewpoint wavelet transform is performed for the corresponding pixels of the R component, the d1 component, the d2 component, and the d3 component on a color component basis, RAW data of the viewpoints a, b, c, and d are generated. At this time, the images of the viewpoints a and c are identical. The images of the viewpoints b and d are also identical. This will be described with reference to FIG. 7A. The images of the viewpoints a and c are images generated by light beams that have passed through a region that combines the regions a and c of a virtual lens 601. The images of the viewpoints b and d are images generated by light beams that have passed through a region that combines the regions b and d of the virtual lens 601. That is, the generated images a and b are suitable for stereo vision because of the large light amount and little noise, unlike the images a and b at the time of imaging. The RAW data of the viewpoints a and b are output to the output unit 1507. The RAW data of the viewpoints c and d may be output, as a matter of course.

iv). When the request is naked eye stereo vision

Encoded data of the R component, the d1 component, the d2 component, and the d3 component of each of the color components (R0 component, G0 component, G1 component, and B0 component) are selected as partial encoded data. When the R component, the d1 component, the d2 component, and the d3 component are decoded on a color component basis, and inverse inter-viewpoint wavelet transform is performed, RAW data of the viewpoints a, b, c, and d are generated. The RAW data of the viewpoints a, b, c, and d are output to the output unit 1507. If viewpoints exist only in the horizontal direction, the encoded data of the R component and the d1 component are selected as partial encoded data. The decoding processing in this case is the same as the processing of iii described above, and a description thereof will be omitted here. The RAW data of the viewpoints a and b are output to the output unit 1507. The RAW data of the viewpoints c and d may be output, as a matter of course.

In this embodiment, an image suitable for a user request can be generated by a small calculation amount by partial decoding of compressed light field RAW data, as compared to a conventional method that performs image processing after decoding compressed light field RAW data.

The output unit 1507 outputs the RAW data output in step S1604 to the storage unit 1503b or the display unit 1508 (step S1605).

With the above-described encoding processing and decoding processing of light field RAW data (divided into 2×2 in the vertical and horizontal directions), image processing such as refocus processing, stereo vision, or naked eye stereo vision can be implemented by a small data amount and a small calculation amount.

Third Embodiment

In the first embodiment, an image encoding apparatus and an image decoding apparatus for light field data in case where the number of divisions of light beam information of a plenoptic camera is 2×2 in the vertical and horizontal directions have been described. In the third embodiment, an image encoding apparatus and an image decoding apparatus for light field data in case where the number of divisions of light beam information of a plenoptic camera is 1×2 in the vertical and horizontal directions will be described.

An image encoding apparatus according to the third embodiment will be described below. The arrangement of the encoding apparatus is the same as in FIG. 1. However, the plenoptic camera according to the third embodiment extracts light beam information passing through divided regions a and b when a main lens 601 is divided into a plurality of parts, as shown in FIG. 17A, unlike the first and second embodiments. In this case as well, the main lens 601 is the virtual lens 601 when imaging lens 501 to 503 are virtually regarded as one lens.

As shown in FIG. 17B, a light beam that has passed through the region a of the main lens 601 enters a pixel group 1701a on the sensor, and a light beam that has passed through the region b of the main lens enters a pixel group 1701b on the sensor. That is, the output from the pixel group 1701a includes the information of a viewpoint corresponding to the lens region a, and the output from the pixel group 1701b includes the information of a viewpoint corresponding to the lens region b. In this embodiment, the sensor has the RGB arrangement of the Bayer pattern. Each of the R, G, and B colors is divided into 1×2=2 pixels, and each pixel is expressed by 14 bits. One color component may be expressed by another number of bits such as 10 bits or 12 bits by dynamic range compression, as a matter of course.

In this embodiment as well, data obtained by demosaicing and developing the light field RAW data shown in FIG. 17B will be referred to as light field data.

For example, when data of elements "a" of G0, R0, B0, and G1 passed through a color filter 508 in FIG. 17B are expressed as a(G0), a(R0), a(B0), and a(G1), respectively, the set can be expressed as in FIG. 17C. The arrangement shown in FIG. 17C is the same as the Bayer arrangement of a normal image sensor having a relationship of 1 color filter=one element. Hence, an image "a" including three, R, G, and B components (in this embodiment, each component is expressed by 8 bits) per pixel can be generated by demosaicing.

Similarly, when data of elements "b" of G0, R0, B0, and G1 passed through the color filter 508 in FIG. 17B are expressed as b(G0), b(R0), b(B0), and b(G1), respectively, the set can be expressed as in FIG. 17D, and an image "b" including three, R, G, and B components per pixel can be generated by demosaicing.

As a result, light field data formed from two images of the viewpoints a and b can be obtained.

The details of processing of an information processing unit 109 according to the third embodiment are the same as in FIG. 8 described in the first embodiment except that the number of divisions of light beam information is 1×2 in the vertical and horizontal directions. The procedure of encoding processing according to the third embodiment will be described below with reference to FIG. 8.

First, an acquisition unit 103 acquires light field RAW data output from a light field imaging unit 102, and outputs the light field RAW data to an image processing unit 104 (step S801).

The image processing unit 104 generates light field data (two images of the viewpoints a and b) by demosaicing the light field RAW data, and outputs the light field data to an LF (Light Field) encoding unit 105 (step S802).

The LF encoding unit 105 performs encoding processing of the light field data. First, to reduce the redundancy between viewpoints from the light field data, the corresponding relationship of pixels between the viewpoints a and b is determined. The corresponding relationship is determined by designating the focus position of a refocus image (step S803).

When an operation unit 101 is set to the refocus mode that adjusts the focus position after shooting, the user inputs an optimum focus position after imaging. For example, using the touch panel function, the user designates the focus position on the image displayed on the liquid crystal display of a display unit 405, thereby inputting to the operation unit 101. The focus position can also be designated using another method of, for example, presenting images of a plurality of focus positions and causing the user to select one of them, as a matter of course.

The refocus image is an image generated by compositing the corresponding pixels between the viewpoints (viewpoints a and b) of the light field data and having a designated focus position. A method of determining the corresponding pixels between viewpoints in light field data will be described with reference to FIGS. 19A and 19B. FIGS. 19A and 19B show an example in which an object 1901 is arranged on the far side and an object 1902 is arranged on the near side. An explanation will be made below assuming that imaging is performed while setting focus on the object 1901.

Corresponding pixels in case where a refocus image is generated from light field data without changing the focus position will be described with reference to FIG. 19A. That is, a case where no focus position change instruction is input in step S803 will be described.

Two pixels 1903a and 1903b into 1×2 are determined as corresponding pixels, and the color values of the two pixels are averaged to form one pixel of the refocus image. The average of the color values of two pixels is calculated using a similar corresponding relationship in all pixels of the viewpoints a and b, and the pixels are arrayed, thereby generating a refocus image. In this embodiment, the corresponding pixels shown in FIG. 19A will be referred to as "corresponding pixels of parallax 0", and the refocus image will be referred to as a "refocus image of parallax 0". That is, when no focus position change instruction is input in step S803, the "corresponding pixels of parallax 0" are set. The "corresponding pixels of parallax 0" are also set when the focus position is not changed because, for example, the operation unit 101 is not set to the refocus mode.

Processing performed when generating a refocus image focused on the object 1902 by changing the focus position will be described next with reference to FIG. 19B. This is processing in case where a focus position change instruction is input in step S803.

Two pixels 1904a and 1904b are determined as corresponding pixels, and the color values of the two pixels are averaged to form one pixel of the refocus image. The average of the color values of two pixels is calculated using a similar corresponding relationship in all pixels of the viewpoints a and b, and the pixels are arrayed, thereby generating a refocus image.

The above processing indicates shifting the pixel groups of the viewpoints (viewpoints a and b) by a designated parallax amount to obtain corresponding pixels. Consider the corresponding points 1903a and 1903b of parallax 0 as a reference. The pixel 1904a is shifted to the right side of the pixel 1903a, and the pixel 1904b is shifted to the left side of the pixel 1903b by one pixel. In this embodiment, the corresponding pixels shown in FIG. 19B will be referred to as "corresponding pixels of parallax 1", and the refocus image will be referred to as a "refocus image of parallax 1".

When generating a refocus image focused on a side farther than the object 1902, the shift directions of the pixel groups of the viewpoints are reversed. That is, when the focus position is to be changed in step S803, "corresponding pixels of parallax N" (N is an integer) are set by shifting the parallax amount according to the focal position (step S804).

Inter-viewpoint wavelet transform is performed for the corresponding pixels set by the above processing to reduce the redundancy between the viewpoints (step S805). Inter-viewpoint wavelet transform means wavelet transform of corresponding pixels between viewpoints in light field data. This will be described with reference to FIG. 19A. Wavelet transform is performed for the corresponding pixels 1903a and 1903b. Here, Haar wavelet transform represented by equations (1) and (2) is used.

Wavelet transform is performed for two pixels that are corresponding pixels in the horizontal direction. Inter-viewpoint wavelet transform will be described with reference to FIGS. 18A and 18B. FIG. 18A shows light field data when the pixel values of the two corresponding pixels are represented by a and b. Wavelet transform of the two corresponding pixels is represented by $$R \text{ component} = (a+b)/2 \quad (13)$$

$$d \text{ component} = (a-b)/2 \quad (14)$$

Note that the R component means not an "R" color but a refocus component.

FIG. 18B shows disassembled components after inter-viewpoint wavelet transform. The pixel values a and b are disassembled into the R component (average component) and the d component (difference component). At this time, the R component is the "refocus image of parallax N" or the "refocus image of parallax 0" in the example of FIG. 19A. In this embodiment, the number of viewpoints is 2. Both the number of average components and the number of difference components are 1. The total number of components is 2. That is, both the number of viewpoints and the total number of components are 2 and match each other. Inter-viewpoint wavelet transform for corresponding pixels having a parallax as shown in FIG. 19B is performed by the same processing as described above.

Next, wavelet transform within the screen is performed for the disassembled components after inter-viewpoint wavelet transform. That is, wavelet transform is performed for each of the R component and the d component. This will be described with reference to FIGS. 18A to 18D. FIG. 18B shows disassembled components after inter-viewpoint wavelet transform. FIG. 18C shows the disassembled components rearranged for each type. When wavelet transform is performed in each of the horizontal and vertical directions for each of the disassembled components (R component and d component), each disassembled component is disassembled into wavelet coefficients (LL component, HL component, LH component, and HH component), as shown in FIG. 18D (step S806).

The wavelet coefficients (LL component, HL component, LH component, and HH component) shown in FIG. 18D are quantized and entropy-encoded (step S807). A standard encoding technique such as JPEG 2000 may be used in steps S806 and S807. When JPEG 2000 is used, each of the disassembled components (R component and d component) is used as the input of JPEG 2000, as shown in FIG. 18C. In this embodiment, the entropy-encoded light field data will be referred to as compressed light field data.

The LF encoding unit 105 outputs the compressed light field data to an output unit 106 (step S808). The output unit 106 outputs the compressed light field data to a storage unit 107 to store the data. The stored compressed light field data is output, via an I/O interface 108, to a device outside the camera. Note that the output compressed light field data has a file structure as shown in FIG. 21, as in the first embodiment.

The image decoding apparatus according to the third embodiment will be described next. The image decoding apparatus according to the third embodiment has the same arrangement as in the first embodiment except that the number of divisions of light beam information is 1×2 in the vertical and horizontal directions, and has the structure shown in FIG. 2. Decoding processing is also performed in accordance with the flowchart of FIG. 11.

Processing of an information processing unit 210 according to the third embodiment will be described below.

First, an acquisition unit 204 acquires a user request from an operation unit 202. The user request is performing, for example, refocus processing, stereo vision, naked eye stereo vision, or depth estimation from light field data. Any other request to, for example, control the depth of field may be acquired as long as the processing is image processing using light field data, as a matter of course. The user request is sent to a code selection unit 205 (step S1101).

The acquisition unit 204 acquires compressed light field data output from a storage unit 203a, and outputs the compressed light field data to the code selection unit 205 (step S1102). In this embodiment, a case where the R component in the compressed light field data is a "refocus image of parallax 0" will be described.

The code selection unit 205 selects, based on the user request, partial encoded data to be decoded from the encoded light field (step S1103). The corresponding relationship between the user request and partial encoded data to be selected is as follows.

i). When the request is refocus processing without changing the focus position

The encoded data of the R component is selected as partial encoded data. That is, the encoded data of the d component is not selected.

ii). When the request is refocus processing by changing the focus position iii). When the request is stereo vision iv). When the request is naked eye stereo vision or v). When the request is depth estimation The encoded data of the R component and the d component are selected as partial encoded data.

The partial encoded data of the compressed light field data selected by the above processing is supplied to an LF (Light Field) decoding unit 206.

The LF decoding unit 206 decodes the partial encoded data of the compressed light field data (step S1104). Inverse Haar wavelet transform is represented by equations (7) and (8). Inverse inter-viewpoint wavelet transform of corresponding two pixels is represented by $$a = R \text{ component} + d \text{ component} \quad (15)$$

$$b = R \text{ component} - d \text{ component} \quad (16)$$

Partial decoding processing (step S1104) of the compressed light field data by the LF decoding unit 206 in response to the user request will be described below with reference to FIG. 18C.

i). When the request is refocus processing without changing the focus position

The encoded data of the R component is selected as partial encoded data. When the R component is decoded, a "refocus image of parallax 0" is generated, as indicated by equation (13).

ii). When the request is refocus processing by changing the focus position iii). When the request is stereo vision iv). When the request is naked eye stereo vision or v). When the request is depth estimation The encoded data of the R component and the d component are selected as partial encoded data. When the R component and the d component are decoded, and inverse inter-viewpoint wavelet transform is performed for the corresponding pixels of the R component and the d component, images of the viewpoints a and b are generated.

It is determined based on the user request whether to perform image processing for the generated image data or output the image data (step S1105). At this time, if the user request is one of i and ii below, the decoded light field data (image data) is output to an output unit 208.

i). When the request is refocus processing without changing the focus position

The generated "refocus image of parallax 0" is output.

ii). When the request is stereo vision

The generated images of the viewpoints a and b are output as stereo images.

If the user request is as follows, image processing is performed for the decoded light field data (step S1106).

i). When the request is refocus processing by changing the focus position

A "refocus image of parallax N" (N is an integer) is generated from the generated images of the viewpoints a and b and output.

ii). When the request is naked eye stereo vision

Free viewpoint image composition is performed for viewpoints according to the number of viewpoints of a naked eye stereo vision display from the generated images of the viewpoints a and b. For example, if the naked eye stereo vision display has eight viewpoints in the horizontal direction, the images of the viewpoints a and b are selected, and six viewpoints between the viewpoints a and b are generated by free viewpoint image composition, thereby outputting image data including eight viewpoints in the horizontal direction. A description of the method of free viewpoint image composition will be omitted here.

iii). When the request is depth estimation

A depth map is generated by stereo matching using the generated images of the viewpoints a and b as stereo images and output as image data. A description of the stereo matching method will be omitted here.

The output unit 208 outputs the image data generated in the above-described way to a storage unit 203b or a display unit 209 (step S1107).

With the above-described encoding processing and decoding processing of light field data (divided into 1×2 in the vertical and horizontal directions), image processing such as refocus processing, stereo vision, naked eye stereo vision, or depth estimation can be implemented by a small data amount and a small calculation amount.

Fourth Embodiment

In the second embodiment, an image encoding apparatus and an image decoding apparatus for light field RAW data in case where the number of divisions of light beam information of a plenoptic camera is 2×2 in the vertical and horizontal directions have been described.

In the fourth embodiment, an image encoding apparatus and an image decoding apparatus for light field RAW data in case where the number of divisions of light beam information of a plenoptic camera is 1×2 in the vertical and horizontal directions will be described. Except this point, the arrangement of the apparatus is the same as in the first embodiment.

Processing of an information processing unit 109 of the image encoding apparatus according to the fourth embodiment will be explained with reference to the flowchart of FIG. 13 (corresponding program is stored in a ROM). First, an acquisition unit 103 acquires light field RAW data output from a light field imaging unit 102, and outputs the light field RAW data to an image processing unit 104 (step S1301).

The image processing unit 104 divides the light field RAW data into color components and outputs the light field RAW data to an LF (Light Field) encoding unit 105 (step S1302).

The image sensor has the RGB arrangement of the Bayer pattern, as shown in FIG. 17B. Each of the R, G, and B colors is divided into 1×2=2 pixels, and each pixel is expressed by 14 bits. One color component may be expressed by another number of bits such as 10 bits or 12 bits by dynamic range compression, as a matter of course.

The light field RAW data division method will be described with reference to FIGS. 20A to 20D. In the color component division, pixels are arrayed for each of the R0 component, G0 component, G1 component, or B0 component, and image data of each color component is formed, as shown in FIGS. 20A to 20D. That is, 1×2 multi-viewpoint images are generated for each of the color components (R0 component, G0 component, G1 component, and B0 component).

The image processing unit 104 outputs the light field RAW data divided for each of the color components (R0 component, G0 component, G1 component, and B0 component) to the LF encoding unit 105.

The LF encoding unit 105 handles the light field RAW data for each of the color components (R0 component, G0 component, G1 component, and B0 component) like the light field data in the third embodiment, thereby performing encoding processing. That is, in FIG. 20A, Haar wavelet transform is performed for two pixels 2001a and 2001b of the G0 component which are adjacent in the horizontal direction to obtain an R component (refocus component) and a d component, and encoding processing is executed. This also applies to the remaining color components R0, B0, and G1 (steps S1305 to S1307).

An output unit 106 outputs the compressed light field RAW data to a storage unit 107 to store the data (step S1308). The stored compressed light field RAW data is output to a device outside the camera via an I/O interface 108.

An image decoding apparatus according to the fourth embodiment will be described below. The arrangement of the decoding apparatus is the same as in the second embodiment, as shown in FIG. 15, and a description thereof will be omitted. Processing of an information processing unit 1510 of the image decoding apparatus according to the fourth embodiment will be described below with reference to the flowchart of FIG. 16.

First, an acquisition unit 1504 acquires a user request from an operation unit 1502. The user request is performing, for example, refocus processing, stereo vision, or naked eye stereo vision from light field RAW data. The user request is sent to a code selection unit 1505 (step S1601).

The acquisition unit 1504 acquires compressed light field RAW data output from a storage unit 1503a, and outputs the compressed light field RAW data to the code selection unit 1505 (step S1602). In this embodiment, a description will be made assuming that the R component (refocus component) of the color components (R0 component, G0 component, G1 component, and B0 component) of the compressed light field RAW data is a "refocus image of parallax 0".

The code selection unit 1505 selects, based on the user request, partial encoded data to be decoded from the compressed light field RAW data (step S1603). Partial encoded data selection processing in response to a user request will be described below.

i). When the request is refocus processing without changing the focus position

Encoded data of the R component of each of the color components (R0 component, G0 component, G1 component, and B0 component) is selected as partial encoded data.

ii). When the request is refocus processing by changing the focus position iii). When the request is stereo vision or iv). When the request is naked eye stereo vision Encoded data of the R component and d component of each of the color components (R0 component, G0 component, G1 component, and B0 component) are selected as partial encoded data.

The partial encoded data of the compressed light field RAW data selected by the above processing is output to an LF (Light Field) decoding unit 1506.

The LF decoding unit 1506 decodes the partial encoded data of the compressed light field RAW data (step S1604). Details of decoding processing based on the user request will be described below.

i). When the request is refocus processing without changing the focus position

Encoded data of the R component of each of the color components (R0 component, G0 component, G1 component, and B0 component) is selected as partial encoded data. When the R component is decoded on a color component basis, RAW data of a "refocus image of parallax 0" is generated. The RAW data of the "refocus image of parallax 0" is output to an output unit 1507.

ii). When the request is refocus processing by changing the focus position iii). When the request is stereo vision or iv). When the request is naked eye stereo vision Encoded data of the R component and the d component of each of the color components (R0 component, G0 component, G1 component, and B0 component) are selected as partial encoded data. When the R component and the d component are decoded on a color component basis, and inverse inter-viewpoint wavelet transform is performed, RAW data of the viewpoints a and b are generated. The RAW data of the viewpoints a and b are output to the output unit 1507.

In the fourth embodiment, an image can be generated by a small calculation amount without unnecessary processing by partial decoding of compressed light field RAW data in response to a user request, as compared to a conventional method that performs image processing after decoding compressed light field RAW data.

The output unit 1507 outputs the RAW data output in i to iv to a storage unit 1503b or a display unit 1508 (step S1605)

With the above-described encoding processing and decoding processing of light field RAW data (divided into 1×2 in the vertical and horizontal directions), image processing such as refocus processing, stereo vision, naked eye stereo vision, or depth estimation can be implemented by a small data amount and a small calculation amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-085885 filed Apr. 17, 2014, which is hereby incorporated by reference herein in its entirety.

The invention claimed is:

1. An image encoding apparatus that encodes N (N is an integer: N≥2) viewpoint images captured at viewpoints different from each other, the apparatus comprising:
   at least one processor; and
   a memory storing a program to be executed by the at least one processor;
   wherein the at least one processor functions as units comprising:
   (1) a first generation unit configured to calculate an average value of values of N corresponding pixels corresponding to each other in the N viewpoint images and generating an image having the average value as a value of a pixel;
   (2) a second generation unit configured to generate (N−1) types of difference values from the corresponding pixels in the N viewpoint images, wherein the (N−1) types of difference values are used to derive the values of the corresponding pixels in the N viewpoint images from the value of the pixel in the average image generated by the first generation unit; and
   (3) an encoding unit configured to encode the image generated by the first generation unit and difference information formed from the (N−1) types of difference values generated by the second generation unit.

2. The apparatus according to claim 1, wherein the first generation unit and the second generation unit perform generation using Haar wavelet transform.

3. The apparatus according to claim 1, wherein the first generation unit includes a determination unit configured to determine, based on a focus position designated by a user, positions of pixels serving as the corresponding pixels in the N viewpoint images.

4. The apparatus according to claim 1, wherein the encoding unit generates a file whose file header stores information representing a storing position of each of encoded data generated from the image generated by the first generation unit and (N−1) encoded data generated from the (N−1) types of difference information generated by second generation unit.

5. The apparatus according to claim 1, further comprising:
   an input unit configured to input light field RAW data before demosaicing, which is captured by a light field imaging unit; and
   a demosaicing unit configured to generate an image of each viewpoint from the light field RAW data input by the input unit.

6. The apparatus according to claim 1, further comprising:
   an input unit configured to input light field RAW data before demosaicing, which is obtained by imaging of a light field imaging unit; and
   an image generation unit configure to generate, if a sensor for each color filter provided in the light field imaging unit has a Bayer arrangement, for each color filter, an image having a value detected by each sensor as a value of a pixel,
   wherein the first generation unit and the second generation unit process the image of each color filter generated by the image generation unit.

7. The apparatus according to claim 1, wherein the encoding unit entropy-encodes, by spatial frequency conversion, each of the image generated by the first generation unit and the (N−1) pieces of difference information generated by the second generation unit.

8. A method of controlling an image encoding apparatus that encodes N (N is an integer: N≥2) viewpoint images captured at viewpoints different from each other, the method comprising:
   a first generation step of calculating an average value of values of N corresponding pixels corresponding to each other in the N viewpoint images and generating an image having the average value as a value of a pixel;
   a second generation step of generating (N−1) types of difference values from the corresponding pixels in the N viewpoint images, wherein the (N−1) types of difference values are used to derive the values of the corresponding pixels in the N viewpoint images from the value of the pixel generated in the first generation step; and
   an encoding step of encoding the image generated in the first generation step and difference information formed from the (N−1) types of difference values generated in the second generation step.

9. A computer-readable storage medium storing a program which causes a computer to execute steps of a method of encoding N (N is an integer: N≥2) viewpoint images captured at viewpoints different from each other, the method comprising:
   a first generation step of calculating an average value of values of N corresponding pixels corresponding to each other in the N viewpoint images and generating an image having the average value as a value of a pixel;
   a second generation step of generating (N−1) types of difference values from the corresponding pixels in the N viewpoint images, wherein the (N−1) types of difference values are used to derive the values of the corresponding pixels in the N viewpoint images from the value of the pixel generated in the first generation step; and an encoding step of encoding the image generated in the first generation step and difference information formed from the (N−1) types of difference values generated in the second generation step.

10. An image decoding apparatus that decodes encoded data of N (N is an integer: N≥2) viewpoint images captured at viewpoints different from each other, the apparatus comprising:

at least one processor; and a memory storing a program to be executed by the at least one processor, wherein the at least one processor functions as units comprising:

(1) a storage unit configured to store first encoded data obtained by encoding an image focused at a predetermined focal position and having, as a value of a pixel, an average value of values of N corresponding pixels corresponding to each other in the N viewpoint images and second encoded data obtained by encoding difference information formed from (N−1) types of difference values from the corresponding pixels in the N viewpoint images, wherein the (N−1) types of difference values are used to derive the values of the corresponding pixels in the N viewpoint images from the image having the average value of the values of the N corresponding pixels as the value of the pixel; and (2) a decoding unit configured to decode at least one of the encoded data stored in storage unit.

11. The apparatus according to claim 10, further comprising an image processing unit configured to perform image processing for one of the image and the difference information decoded by the decoding unit and to generate image data.

12. The apparatus according to claim 10, wherein the decoding unit switches between whether to decode only the first encoded data, whether to decode encoded data corresponding to some types of the first encoded data and the second encoded data, and whether to decode all of the first encoded data and the second encoded data.

13. The apparatus according to claim 10, further comprising an input unit configured to input an instruction of refocus processing by a user, wherein the decoding unit decodes only the first encoded data when the input unit has input refocus processing without changing a focus position.

14. The apparatus according to claim 10, further comprising an input unit configured to input an instruction of refocus processing by a user, wherein the decoding unit decodes all of the first encoded data and the second encoded data when refocus processing by changing a focus position is input.

15. The apparatus according to claim 10, further comprising an input unit configured to input an instruction of stereo image generation by a user, wherein the decoding unit decodes only encoded data corresponding to some pieces of difference information out of the first encoded data and the second encoded data when the input unit has input the stereo image generation.

16. A method of controlling an image decoding apparatus that decodes encoded data of N (N is an integer: N≥2) viewpoint images captured at viewpoints different from each other, the method comprising:

storing, in a predetermined storage unit, first encoded data obtained by encoding an image focused at a predetermined focal position and having, as a value of a pixel, an average value of values of N corresponding pixels corresponding to each other in the N viewpoint images and second encoded data obtained by encoding difference information formed from (N−1) types of difference values from the corresponding pixels in the N viewpoint images, wherein the (N−1) types of difference values are used to derive the values of the corresponding pixels in the N viewpoint images from the image having the average value of the values of the N corresponding pixels as the value of the pixel; and decoding at least one of the encoded data stored in the predetermined storage unit.

* * * * *